United States Patent
Li et al.

(10) Patent No.: US 12,212,693 B2
(45) Date of Patent: *Jan. 28, 2025

(54) METHOD, COMPUTER PROGRAM PRODUCT AND APPARATUS FOR CREATING, REGISTERING, AND VERIFYING DIGITALLY SEALED ASSETS

(71) Applicant: Auth9, Inc., San Mateo, CA (US)

(72) Inventors: Hongjun Li, Newark, CA (US); Ning Xu, Foster City, CA (US)

(73) Assignee: Auth9, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,733

(22) Filed: Oct. 2, 2023

(65) Prior Publication Data

US 2024/0113896 A1  Apr. 4, 2024

Related U.S. Application Data

(63) Continuation of application No. 17/485,130, filed on Sep. 24, 2021, now Pat. No. 11,777,744, which is a
(Continued)

(51) Int. Cl.
  *H04L 9/32* (2006.01)
(52) U.S. Cl.
  CPC .......... *H04L 9/3268* (2013.01); *H04L 9/3247* (2013.01); *H04L 9/321* (2013.01)
(58) Field of Classification Search
  CPC ...... H04L 9/3286; H04L 9/3247; H04L 9/321
(Continued)

(56) References Cited

U.S. PATENT DOCUMENTS

| | | |
|---|---|---|
| 9,411,982 B1 | 8/2016 | Dippenaar et al. |
| 9,680,805 B1 | 6/2017 | Rodgers et al. |

(Continued)

FOREIGN PATENT DOCUMENTS

| | | |
|---|---|---|
| CN | 1838163 A | 9/2006 |
| CN | 1864365 A | 11/2006 |

(Continued)

OTHER PUBLICATIONS

Li et al., "Research and Implementation of Electronic Seal System Based on Blockchain Technology," 2023 IEEE 11th Joint International Information Technology and Artificial Intelligence Conference (ITAIC), Chongqing, China, 2023, pp. 28-32, doi: 10.1109/ITAIC58329.2023.10408984. (Year: 2023).*

(Continued)

*Primary Examiner* — Peter C Shaw
(74) *Attorney, Agent, or Firm* — Weaver Austin Villeneuve & Sampson LLP

(57) ABSTRACT

A method, apparatus and computer program product are provided for generating a registered certified seal, sealing an asset, and verifying a sealed asset. In an example embodiment, a method is provided for receiving a request to generate a registered certified seal from an entity, accessing certifier entity data via a uniform resource locator of a certification authority identified by a certifying certificate, and verifying a digitally signed entity certifying certificate. The method further comprises upon verifying the digitally signed entity certifying certificate, receiving seal data comprising a seal data key for a certified seal, and saving the seal data for the entity within a digital seal registry, wherein the digital seal registry is searchable based at least in part on at least a portion of the seal data key.

17 Claims, 21 Drawing Sheets

Related U.S. Application Data continuation of application No. 16/452,386, filed on Jun. 25, 2019, now Pat. No. 11,159,333.

(60) Provisional application No. 62/744,554, filed on Oct. 11, 2018, provisional application No. 62/712,974, filed on Aug. 1, 2018, provisional application No. 62/689,462, filed on Jun. 25, 2018.

(58) Field of Classification Search
USPC .................................................. 713/156
See application file for complete search history.

(56) References Cited

U.S. PATENT DOCUMENTS

| | | | |
|---|---|---|---|
| 10,298,551 | B1 | 5/2019 | Perlman et al. |
| 10,373,129 | B1 | 8/2019 | James et al. |
| 11,159,333 | B2 | 10/2021 | Li et al. |
| 11,611,539 | B2 | 3/2023 | Li et al. |
| 11,777,744 | B2 | 10/2023 | Li et al. |
| 2004/0133812 | A1 | 7/2004 | Ohmori et al. |
| 2004/0193902 | A1 | 9/2004 | Vogler et al. |
| 2005/0154889 | A1* | 7/2005 | Ashley ............... H04L 9/3234 713/171 |
| 2005/0278534 | A1 | 12/2005 | Nadalin et al. |
| 2006/0010324 | A1 | 1/2006 | Appenzeller et al. |
| 2006/0047960 | A1 | 3/2006 | Ono et al. |
| 2007/0219917 | A1 | 9/2007 | Liu et al. |
| 2007/0233602 | A1 | 10/2007 | Zweig et al. |
| 2007/0233606 | A1 | 10/2007 | Zweig et al. |
| 2008/0046263 | A1 | 2/2008 | Sager et al. |
| 2009/0169012 | A1 | 7/2009 | Smith et al. |
| 2009/0327296 | A1 | 12/2009 | Francis et al. |
| 2009/0327298 | A1 | 12/2009 | Jones et al. |
| 2010/0082994 | A1 | 4/2010 | Wang et al. |
| 2013/0339725 | A1 | 12/2013 | Sabo et al. |
| 2014/0137270 | A1 | 5/2014 | Dunkeld et al. |
| 2014/0189808 | A1 | 7/2014 | Mahaffey et al. |
| 2014/0365781 | A1 | 12/2014 | Dmitrienko et al. |
| 2015/0095999 | A1* | 4/2015 | Toth ............... H04L 9/3263 726/6 |
| 2015/0127940 | A1 | 5/2015 | Polehn et al. |
| 2015/0372814 | A1 | 12/2015 | Ali et al. |
| 2016/0065370 | A1 | 3/2016 | Le Saint et al. |
| 2016/0085955 | A1 | 3/2016 | Lerner |
| 2016/0087946 | A1 | 3/2016 | Yang et al. |
| 2016/0203572 | A1 | 7/2016 | McConaghy et al. |
| 2016/0261682 | A1 | 9/2016 | Rajagopalan et al. |
| 2016/0300234 | A1 | 10/2016 | Moss-Pultz et al. |
| 2017/0063531 | A1 | 3/2017 | Sullivan |
| 2017/0070510 | A1 | 3/2017 | Ramalingam et al. |
| 2017/0078255 | A1 | 3/2017 | Nejadian et al. |
| 2017/0103385 | A1 | 4/2017 | Wilson, Jr. et al. |
| 2017/0237554 | A1 | 8/2017 | Jacobs et al. |
| 2017/0279785 | A1 | 9/2017 | Kent |
| 2018/0077147 | A1 | 3/2018 | Kelsey |
| 2018/0145970 | A1* | 5/2018 | Agrawal ............... H04L 63/105 |
| 2018/0173871 | A1* | 6/2018 | Toth ............... H04W 12/126 |
| 2018/0176013 | A1 | 6/2018 | Cheng et al. |
| 2018/0367316 | A1 | 12/2018 | Cheng et al. |
| 2019/0068565 | A1 | 2/2019 | Bhattacharjee et al. |
| 2019/0222419 | A1 | 7/2019 | Adams et al. |
| 2019/0295185 | A1 | 9/2019 | Nabi et al. |
| 2020/0092090 | A1 | 3/2020 | Lin et al. |
| 2020/0127813 | A1 | 4/2020 | Millar et al. |
| 2020/0195621 | A1 | 6/2020 | Li et al. |
| 2020/0242711 | A1 | 7/2020 | Cao et al. |
| 2021/0099295 | A1 | 4/2021 | Li et al. |
| 2022/0014390 | A1 | 1/2022 | Li et al. |

FOREIGN PATENT DOCUMENTS

| | | |
|---|---|---|
| CN | 101017544 A | 8/2007 |
| CN | 101022339 A | 8/2007 |
| CN | 102043912 A | 5/2011 |
| CN | 107851284 A | 3/2018 |
| CN | 109155036 A | 1/2019 |
| GB | 201400915 | 3/2014 |
| JP | H10107787 A | 4/1998 |
| JP | 2008035019 A | 2/2008 |
| JP | 2008515741 A | 5/2008 |
| JP | 2011160361 A | 8/2011 |
| JP | 2011165221 A | 8/2011 |
| JP | 2016503988 A | 2/2016 |
| JP | 2016220062 A | 12/2016 |
| JP | 2018515048 A | 6/2018 |
| KR | 20090000740 A | 1/2009 |
| SG | 11201809585 W | 11/2018 |
| WO | WO-2009101478 A2 | 8/2009 |
| WO | WO-2015107219 A1 | 7/2015 |
| WO | WO-2016164496 A1 | 10/2016 |
| WO | WO-2017195160 A1 | 11/2017 |

OTHER PUBLICATIONS

Jian et al., "Study of an electronic seal system based on elliptic curve cryptography and public-key infrastructure," 2010 2nd International Conference on Future Computer and Communication, Wuhan, China, 2010, pp. V2-760-V2-763, doi: 10.1109/ICFCC.2010.5497613. (Year: 2010).*

Zhang, "Scheme of Electronic Seal Based on Public Key Infrastructure," 2008 Workshop on Power Electronics and Intelligent Transportation System, Guangzhou, China, 2008, pp. 61-64, doi: 10.1109/PEITS.2008.126. (Year: 2008).*

Xue-Feng, "Design of electronic seal system based on PKI," 2011 International Conference on E-Business and E-Government (ICEE), Shanghai, China, 2011, pp. 1-3, doi: 10.1109/ICEBEG.2011.5881997. (Year: 2011).*

Anonymous: "How to reset a lost or forgotten password", Aug. 30, 2019 (Aug. 30, 2019), XP055753511, Retrieved from the Internet: URL: https://web.archive.org/web/20190830060503/https://help.twitter.com/en/managing-your-account/forgotten-or-lost-password-reset [retrieved on Nov. 24, 2020].

Antonopoulos, A.M., "Mastering Bitcoin—Unlocking Digital Cryptocurrencies", O'Reilly Media, Dec. 20, 2014, 298 pages.

Bin et. al., "Electronic seal system based on RSA algorithm and public-key infrastructure", doi: 10.11 09/ICNDS.201 0.5479289, 2010, pp. 636-639. (Year: 2010).

Bin, M., et al., "Electronic Seal System based on RSA Algorithm and Public-key Infrastructure", 2010 International Conference on Networking and Digital Society, Wenzhou, China, 2010, pp. 636-639.

Bissessar, D., et al., "Using Biometric Key Cornrnitrnents to Prevent Unauthorized Lending of Cryptographic Credentials", 2014 Twelfth Annual International Conference on Privacy, Security and Trust, Toronto, ON, Canada, 2014, pp. 75-83.

CN Office Action dated Aug. 2, 2023, in application No. CN202080018395.1.

CN Office Action dated May 10, 2023, in Application No. CN201980029909 with English translation.

Conde, R.C.R., et al., "Using Intel SGX to Protect Authentication Credentials in an Untrusted Operating System", 2018 IEEE Symposium on Computers and Communications (ISCC), Natal, Brazil, 2018, pp. 00158-00163.

EP Extended European Search report dated Jan. 2, 2023, in Application No. EP20744321.9.

EP office action dated Jan. 19, 2023, in application No. EP20200744321.

EP Partial Supplementary European Search report dated Sep. 23, 2022 in Application No. EP20744321.9.

EP Search Report dated Jan. 5, 2022, in Application No. EP19824666.2.

Higashikado, Y. et al., "A study on certificate management in consortium chain", Cryptography and information security Symposium (SCIS2017) Proceedings [USB], Jan. 24, 2017, 1F2-3, pp. 1-4.

IN Office Action dated Dec. 17, 2021 in IN Application 202047053487.

IN Office Action dated May 25, 2022 in Application No. IN202147035504.

(56) References Cited

OTHER PUBLICATIONS

International Preliminary Report on Patentability dated Apr. 7, 2022, in Application No. PCT/US2020/053123.
International Preliminary Report on Patentability dated Jan. 7, 2021 in PCT Application PCT/US2019/039073.
International Preliminary Report on Patentability dated Jul. 27, 2021 in PCT Application PCT/US2020/015251.
International Search Report and Written Opinion dated Dec. 4, 2020 in PCT Application PCT/US2020/053123.
International Search Report and Written Opinion dated Jun. 8, 2020 in PCT Application PCT/US2020/015251.
International Search Report and Written Opinion dated Sep. 13, 2019 in PCT Application PCT/US2019/039073.
Jian. X, et al., "Study of an Electronic Seal System Based on Elliptic Curve Cryptography and Public-key Infrastructure", 2010 2nd International Conference on Future Computer and Communication, 2010, pp. V2-760-V2-763.
Jing, Y., et al., "The Introduction of Digital Identity Evolution and the Industry of Decentralized Identity", 2021 3rd International Academic Exchange Conference on Science and Technology Innovation (IAECST), Guangzhou, China, 2021, pp. 504-508.
JP Office Action dated Dec. 20, 2021, in Application No. JP2021-514956 with English translation.
JP Office Action dated Jun. 15, 2023 in Application No. JP2021543376 with English Translation.
JP Office action dated Oct. 5, 2022, in JP Application No. JP2021-543376 with English translation.
JP Office Action dated Oct. 11, 2022, in Application No. JP2021-514956 with English translation.
Koonce entitled "Transfers of Digital Assets and Tokens (Why Blockchain Matters to the Arts, Part 2)".
Liang, X., et al., "Man in the Cloud (MITC) Defender: SGX-Based User Credential Protection for Synchronization Applications in Cloud Computing Platform", 2017 IEEE 10th International Conference on Cloud Computing (CLOUD), Honolulu, HI, USA, 2017, pp. 302-309.
Marc Rennhard., et al., "SecureSafe", Proceedings of the First Workshop On Measurement, Privacy, and Mobility, MPM '12, Jan. 1, 2012 (Jan. 1, 2012), pp. 1-6, XP055267495, New York, New York, USA DOI: 10.1145/2181196.2181197 ISBN: 978-1-4503-1163-2.
U.S. Non-Final office Action dated Oct. 6, 2022 in U.S. Appl. No. 17/485,130.
U.S. Corrected Notice of Allowance dated Aug. 30, 2023, in U.S. Appl. No. 17/485,130.
U.S. Final office Action dated Aug. 18, 2023 in U.S. Appl. No. 16/773,799.
U.S. Final Office Action dated Dec. 23, 2022 in U.S. Appl. No. 17/035,413.
U.S. Non-Final office Action dated Jan. 23, 2023 in U.S. Appl. No. 16/773,799.
U.S. Non-Final office Action dated Jun. 2, 2022 in U.S. Appl. No. 17/035,413.
U.S. Notice of Allowance dated Oct. 26, 2022 in U.S. Appl. No. 16/716,211.
U.S. Notice of Allowance dated Apr. 19, 2023 in U.S. Appl. No. 17/485,130.
US Notice of Allowance dated Jun. 24, 2021 in U.S. Appl. No. 16/452,386.
US Office Action dated Apr. 13, 2022 in U.S. Appl. No. 16/716,211.
US Office Action dated Dec. 21, 2020 in U.S. Appl. No. 16/452,386.
US Office Action dated May 13, 2021 in U.S. Appl. No. 16/452,386.
US Office Action dated Sep. 15, 2021 in U.S. Appl. No. 16/716,211.
U.S. Restriction Requirement dated May 26, 2022, in U.S. Appl. No. 16/773,799.
Yuan et al., "Implementation for Electronic Seal-Stamping Using Self-Certified Public Key in E-Commerce", IEEE, doi: 10.1109/ITAPP.2010.5566190, 2010, pp. 1-4. (Year: 2010).
Zhang et al., "Scheme of Electronic Seal Based on Public Key Infrastructure", doi: 10.1109/PEITS.2008.126, 2008, pp. 61-64. (Year: 2008).
Zhao et al., "Design of electronic seal system based on PKI", doi: 10.1109/ICEBEG.2011.5881997, 2011, pp. 1-3. (Year: 2011).
Zhao, X., et al., "Design of Electronic Seal System based on PKI", 2011 International Conference on E-Business and E-Government (ICEE), Shanghai, China, 2011, pp. 1-3.
JP Office Action dated Apr. 11, 2024 in JP Application No. 2023-0017619.

* cited by examiner

METHOD, COMPUTER PROGRAM PRODUCT AND APPARATUS FOR CREATING, REGISTERING, AND VERIFYING DIGITALLY SEALED ASSETS

CROSS-REFERENCE TO RELATED APPLICATIONS

This patent application claims priority from U.S. Provisional Appl. Ser. No. 62/689,462, filed Jun. 25, 2018, U.S. Provisional Appl. Ser. No. 62/712,974, filed Aug. 1, 2018, and U.S. Provisional Appl. No. Ser. No. 62/744,554, filed Oct. 11, 2018, all of which are incorporated herein by reference in its entirety.

FIELD OF THE INVENTION

Embodiments of the present invention generally relate to authenticating assets and, more particularly, relate to generating an authentic signed and sealed certification from a certified entity.

BACKGROUND OF THE INVENTION

As commercial transactions increasingly spread online, a technique for verifying the integrity and source of data transmitted online has become important.

However, due at least in part to the inherently anonymous nature of internet-based transactions, as well as the growing number of opportunities for information transmissions to be intercepted and/or tampered with, the receiver of digital data often cannot confirm the truth of the digital data or its sender only by looking at the digital data. Accordingly, the truth of data transmitted to a receiver could only be confirmed through alternative mechanisms of communication using previous technology.

It is therefore an object of the present invention to provide a technique which can solve the above problems and can realize entity verification and asset authentication when digital data is sent or received. As a result, it may be desirable to provide a mechanism by which digitally signed and sealed assets may be authenticated. Additionally, it may be desirable to provide a commonly trusted mechanism or platform to validate the authenticity of the digital data and transactions.

BRIEF SUMMARY OF THE INVENTION

In general, embodiments of the present invention provided herein include methods, apparatus, and computer program products for generating a registered certified seal, sealing an asset, and verifying a sealed asset.

In some embodiments, an apparatus for generating a registered certified seal may be provided comprising at least one processor, and at least one memory having computer coded instructions therein. In some embodiments, the apparatus comprises computer instructions configured to, when executed by the processor, cause the apparatus to receive a request to generate a registered certified seal from an entity, wherein the request comprises a digitally signed entity certifying certificate comprising a public key of a public key-private key pair, access certifier entity data of a certification authority identified by the certifying certificate, and verify the digitally signed entity certifying certificate based at least in part on the certifier entity data associated with the certifying certificate and accessed from the certification authority. Upon verifying the digitally signed entity certifying certificate, the apparatus includes the computer instructions further configured to, when executed by the processor, cause the apparatus to receive seal data comprising a seal data key for a certified seal, and save the seal data for the entity within a digital seal registry, wherein the digital seal registry is searchable based at least in part on at least a portion of the seal data key. The digital seal registry is a software as a service (SaaS) registry service.

In an example embodiment, the digitally signed entity certifying certificate certifies the entity by the certification authority.

The apparatus is further configured to determine whether the entity is authentic based on at least one unique entity identifier and after determining that the entity is authentic, digitally sign identity entity data comprising the at least one unique entity identifier to generate the entity certifying certificate.

In another example embodiment, the seal data comprises an electronic seal, seal meta-data, and sealer information indicating at least one of: what the seal is used for, how the seal is used, or a time range the electronic seal is valid. The seal data key comprises a seal public key of the certified seal and seal data to uniquely identify the certified seal.

In yet another example embodiment, the computer coded instructions are further configured to, when executed by the processor, to cause the apparatus to receive a request to verify a sealed asset, wherein the sealed asset is generated by the entity and identifies the seal data key, query the digital seal registry based at least in part on the seal data key and verify the sealed asset based at least in part on the seal data key.

A method is additionally provided for generating a registered certified seal, the method comprises receiving a request to generate a registered certified seal from an entity, wherein the request comprises a digitally signed entity certifying certificate, accessing certifier entity data of a certification authority identified by the certifying certificate, and verifying the digitally signed entity certifying certificate based at least in part on the certifier entity data associated with the certifying certificate and accessed from the certification authority.

The method further comprises upon verifying the digitally signed entity certifying certificate, receiving seal data comprising a seal data key for a certified seal, wherein the seal data is uniquely generated by the entity and saving the seal data for the entity within a digital seal registry, wherein the digital seal registry is searchable based at least in part on at least a portion of the seal data key.

The method further comprises determining whether the entity is authentic based on at least one unique entity identifier and after determining that the entity is authentic, digitally signing identity entity data comprising the at least one unique entity identifier to generate the entity certifying certificate.

In yet another example embodiment, the method comprises receiving a request to verify a sealed asset, wherein the sealed asset is generated by the entity and identifies the seal data key, querying the digital seal registry based at least in part on the seal data key and verifying the sealed asset based at least in part on the seal data key.

A computer program product for generating a registered certified seal is also provided, the computer program product comprising a non-transitory computer readable storage medium and computer program instructions stored therein, the computer program instructions comprising program instructions configured to receive a request to generate a registered certified seal from an entity, wherein the request comprises a digitally signed entity certifying certificate, access certifier entity data of a certification authority identified by the certifying certificate, and verify the digitally signed entity certifying certificate based at least in part on the certifier entity data associated with the certifying certificate and accessed from the certification authority. Upon verifying the digitally signed entity certifying certificate, the computer program product is further configured to receive seal data comprising a seal data key for a certified seal, wherein the seal data is uniquely generated by the entity and save the seal data for the entity within a digital seal registry, wherein the digital seal registry is searchable based at least in part on at least a portion of the seal data key. The digital seal registry is a software as a service (SaaS) registry service.

The computer program product is further configured to determine whether the entity is authentic based on at least one unique entity identifier and after determining that the entity is authentic, digitally sign identity entity data comprising the at least one unique entity identifier to generate the entity certifying certificate.

In an example embodiment, the computer program instructions comprising program instructions are further configured to receive a request to verify a sealed asset, wherein the sealed asset is generated by the entity and identify the seal data key, query the digital seal registry based at least in part on the seal data key and verify the sealed asset based at least in part on the seal data key.

In another example embodiment, an apparatus for sealing an asset is provided, the apparatus comprising at least one processor, and at least one memory having computer coded instructions therein, with the computer instructions configured to, when executed by the processor, cause the apparatus to generate asset data associated with an asset of an entity, wherein the asset data uniquely identifies the asset and the entity, transmit seal data to an independent seal data registry for storage therein, wherein the seal data registry comprises entity certification data corresponding to the entity and wherein the seal data comprises a public key of an entity specific public key-private key pair, digitally sign the asset data associated with the asset via a private key of the entity specific public key-private key pair to generate signed asset data, transmit the signed asset data for storage in a signed asset registry, wherein the signed asset registry is accessible by one or more verifiers to enable verification of the signed asset data based at least in part on the public key of the entity-specific public key-private key pair and provide the one or more verifiers with access to the signed asset data within the signed asset registry and the seal data within the seal data registry.

In an example embodiment, the at least one memory having computer coded instructions therein, with the computer instructions configured to, when executed by the processor, further cause the apparatus to digitally sign seal data for a certified seal via a digitally signed entity certifying certificate, digitally sign the digitally signed entity certifying certificate via a certifying certificate to generate a certified seal signature, digitally sign the asset data with a certified entity signature, and transmit the signed asset data for storage in a registry entry of a digital seal registry, wherein the digital seal registry is publicly accessible to enable verification of the signed asset data based at least in part on a public key of the entity-specific public key-private key pair and a seal public key of the certified seal.

A method for sealing an asset is provided comprising generating asset data associated with an asset of an entity, wherein the asset data uniquely identifies the asset and the entity, transmitting seal data to an independent seal data registry for storage therein, wherein the seal data registry comprises entity certification data corresponding to the entity and wherein the seal data comprises a public key of an entity specific public key-private key pair, digitally signing the asset data associated with the asset via a private key of the entity specific public key-private key pair to generate signed asset data, transmitting the signed asset data for storage in a signed asset registry, wherein the signed asset registry is accessible by one or more verifiers to enable verification of the signed asset data based at least in part on the public key of the entity-specific public key-private key pair and providing the one or more verifiers with access to the signed asset data within the signed asset registry and the seal data within the independent seal data registry.

In an example embodiment, the method further comprises digitally signing seal data for a certified seal and the asset data via a digitally signed entity certifying certificate, digitally signing the digitally signed entity certifying certificate via a certifying certificate to generate a certified seal signature, digitally signing the asset data with a certified entity signature, and transmitting the signed asset data for storage in a registry entry of a digital seal registry, wherein the digital seal registry is publicly accessible to enable verification of the signed asset data based at least in part on a public key of the entity-specific public key-private key pair and a seal public key of the certified seal.

In another example embodiment, a computer program product for sealing an asset is also provided, the computer program product comprising a non-transitory computer readable storage medium and computer program instructions stored therein, the computer program instructions comprising program instructions configured to generate asset data associated with an asset of an entity, wherein the asset data uniquely identifies the asset and the entity, transmit seal data to an independent seal data registry for storage therein, wherein the seal data registry comprises entity certification data corresponding to the entity and wherein the seal data comprises a public key of an entity specific public key-private key pair, digitally sign the asset data associated with the asset via a private key of the entity specific public key-private key pair to generate signed asset data, transmit the signed asset data for storage in a signed asset registry, wherein the signed asset registry is accessible by one or more verifiers to enable verification of the signed asset data based at least in part on the public key of the entity-specific public key-private key pair and provide the one or more verifiers with access to the signed asset data within the signed asset registry and the seal data within the independent seal data registry.

In an example embodiment, the computer program product is further configured to digitally sign seal data for a certified seal and the asset data via a digitally signed entity certifying certificate, digitally sign the digitally signed entity certifying certificate via a certifying certificate to generate a certified seal signature, digitally sign the asset data with a certified entity signature, and transmit the signed asset data for storage in a registry entry of a digital seal registry, wherein the digital seal registry is publicly accessible to enable verification of the signed asset data based at least in part on a public key of the entity-specific public key-private key pair and a seal public key of the certified seal.

In yet another example embodiment, an apparatus for verifying a sealed asset is provided, the apparatus comprising at least one processor, and at least one memory having computer coded instructions therein, with the computer instructions configured to, when executed by the processor, cause the apparatus to receive an asset identifier associated with a sealed asset, wherein the asset identifier links to the sealed asset in a seal registry, identify the seal registry storing registry data relating to the asset identifier, query the seal registry to retrieve the registry data relating to the asset identifier, wherein the registry data comprises a seal data key generated by a certified entity, wherein the sealed data key matches a verified digital signature of the sealed asset generated by the certified entity and determine whether the digital signature of the asset identifier matches the seal data key of the registry data to verify the sealed asset.

The at least one memory having computer coded instructions therein, with the computer instructions configured to, when executed by the processor, further cause the apparatus to determine whether the certified entity matches entity data of the registry data to verify the sealed asset.

The apparatus is further configured to verify a certifier entity signature of the registry data matches the certifying certificate to verify the sealed asset and verify a certifier of the certifier entity signature associated with the certifying certificate to verify the sealed asset.

In another example embodiment, a method is provided for verifying a sealed asset, the method comprises receiving an asset identifier associated with a sealed asset, wherein the asset identifier links to the sealed asset in a seal registry, identifying the seal registry storing registry data relating to the asset identifier, querying the seal registry to retrieve the registry data relating to the asset identifier, wherein the registry data comprises a seal data key generated by a certified entity, wherein the sealed data key matches a verified digital signature of the sealed asset generated by the certified entity and determining whether the digital signature of the asset identifier matches the seal data key of the registry data to verify the sealed asset.

The method further comprises determining whether the certified entity matches entity data of the registry data to verify the sealed asset, verifying a certifier entity signature of the registry data matches the certifying certificate to verify the sealed asset and verifying a certifier of the certifier entity signature associated with the certifying certificate to verify the sealed asset.

In yet another example embodiment, a computer program product is provided for verifying a sealed asset, the computer program product comprising a non-transitory computer readable storage medium and computer program instructions stored therein, the computer program instructions comprising program instructions configured to receive an asset identifier associated with a sealed asset, wherein the asset identifier links to the sealed asset in a seal registry, identify the seal registry storing registry data relating to the asset identifier, query the seal registry to retrieve the registry data relating to the asset identifier, wherein the registry data comprises a seal data key generated by a certified entity, wherein the sealed data key matches a verified digital signature of the sealed asset generated by the certified entity and determine whether the digital signature of the asset identifier matches the seal data key of the registry data to verify the sealed asset.

The computer program instructions comprising program instructions further configured to determine whether the certified entity matches entity data of the registry data to verify the sealed asset.

In an example embodiment, the computer program product is further configured to verify a certifier entity signature of the registry data matches the certifying certificate to verify the sealed asset and verify a certifier of the certifier entity signature associated with the certifying certificate to verify the sealed asset.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
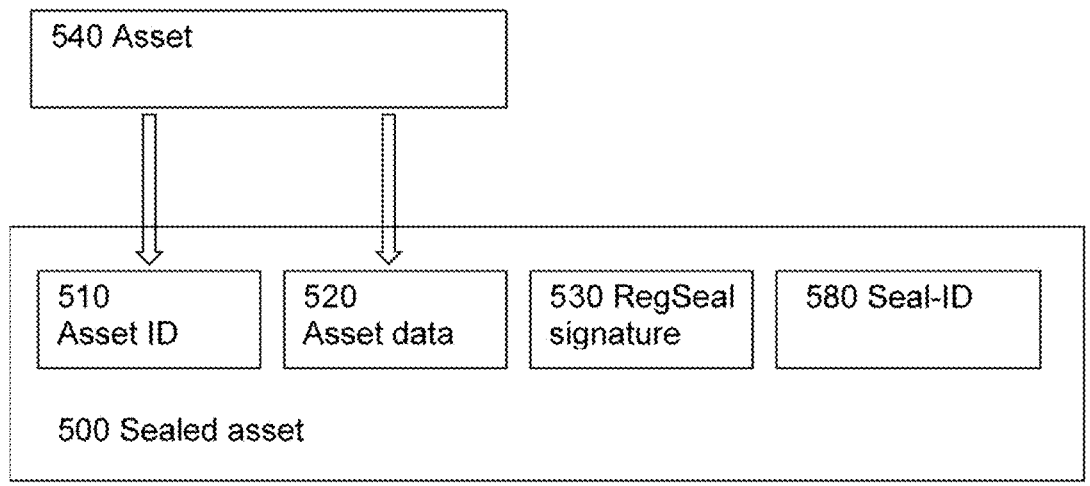
FIG. 5 is a basic block diagram illustrating a registered certified seal record that may benefit from exemplary embodiments of the present invention.
Figure 5A:
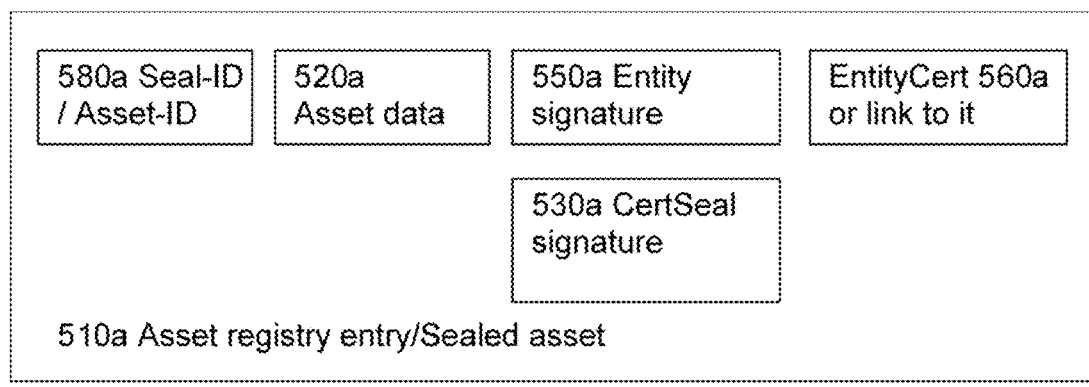
Figure 6:
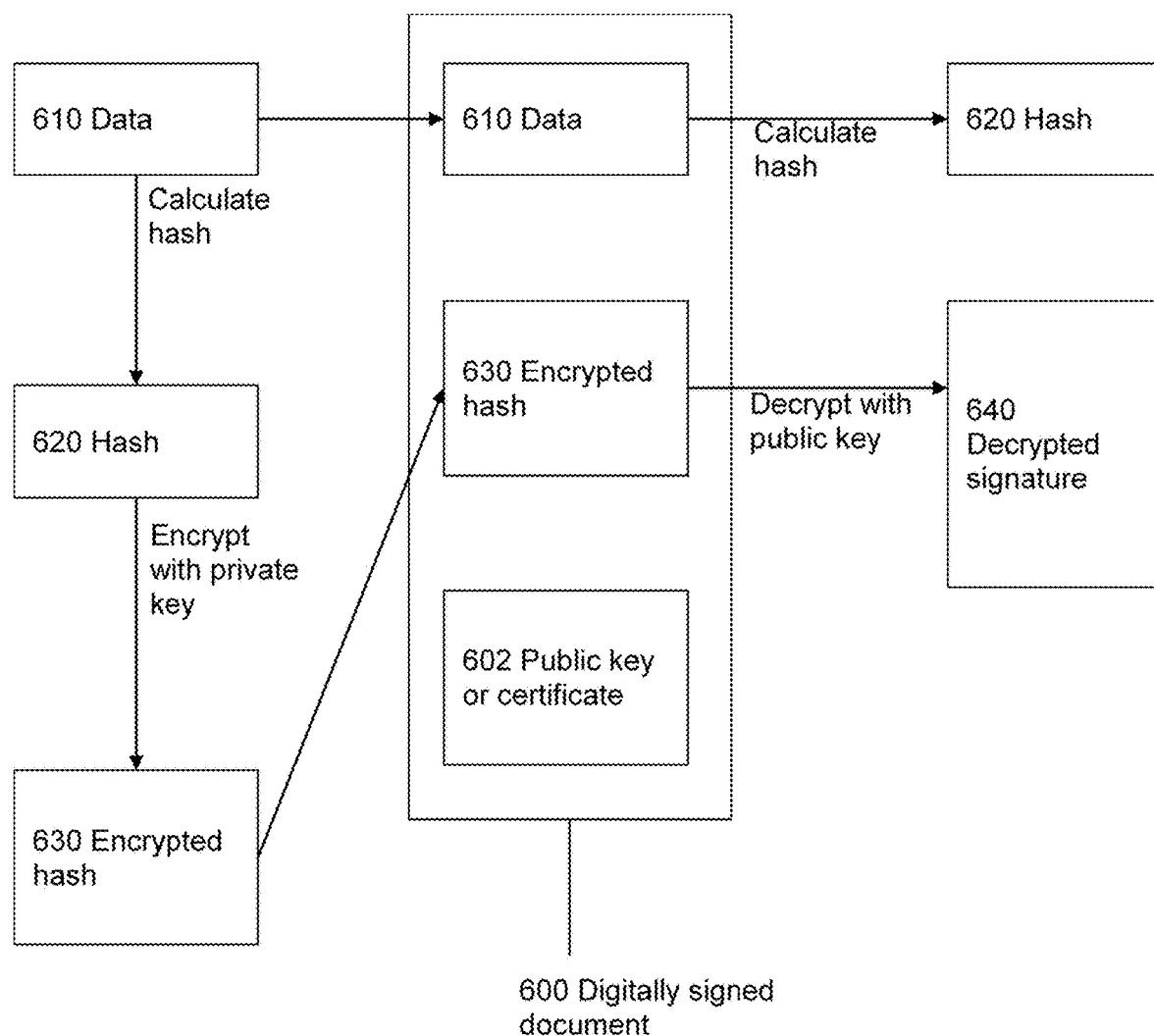
Figure 6A:
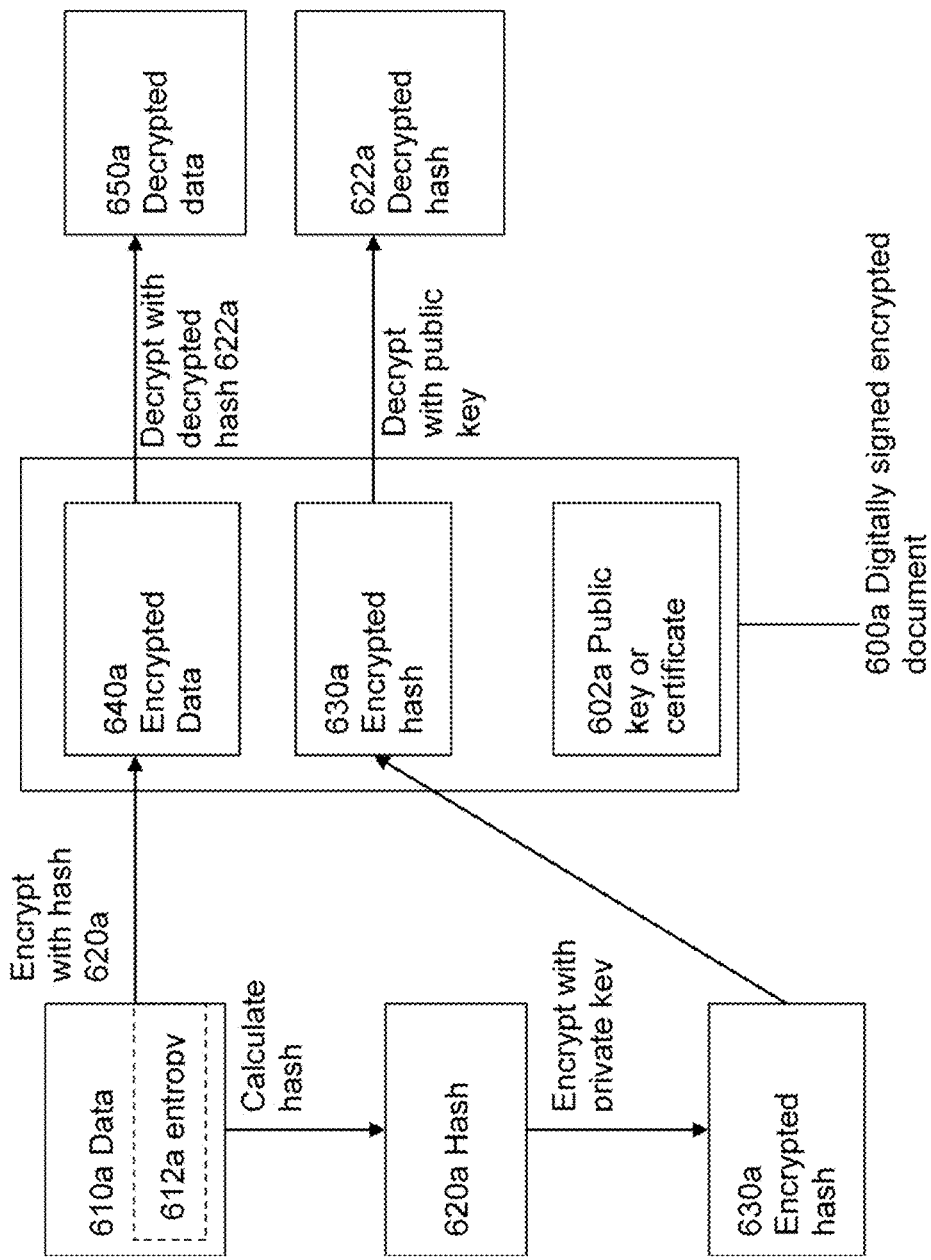
Figure 6B:
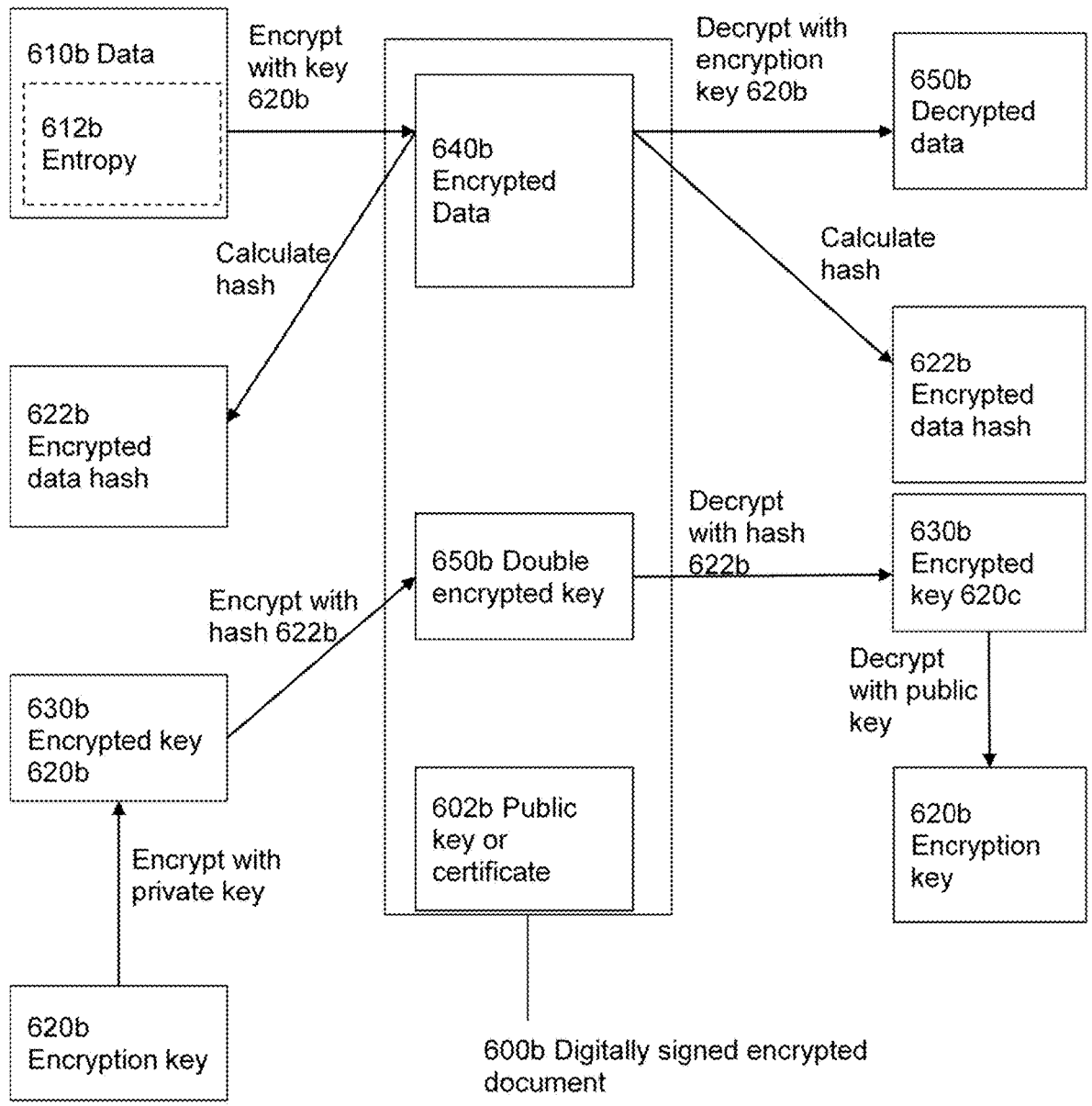
Figure 7:
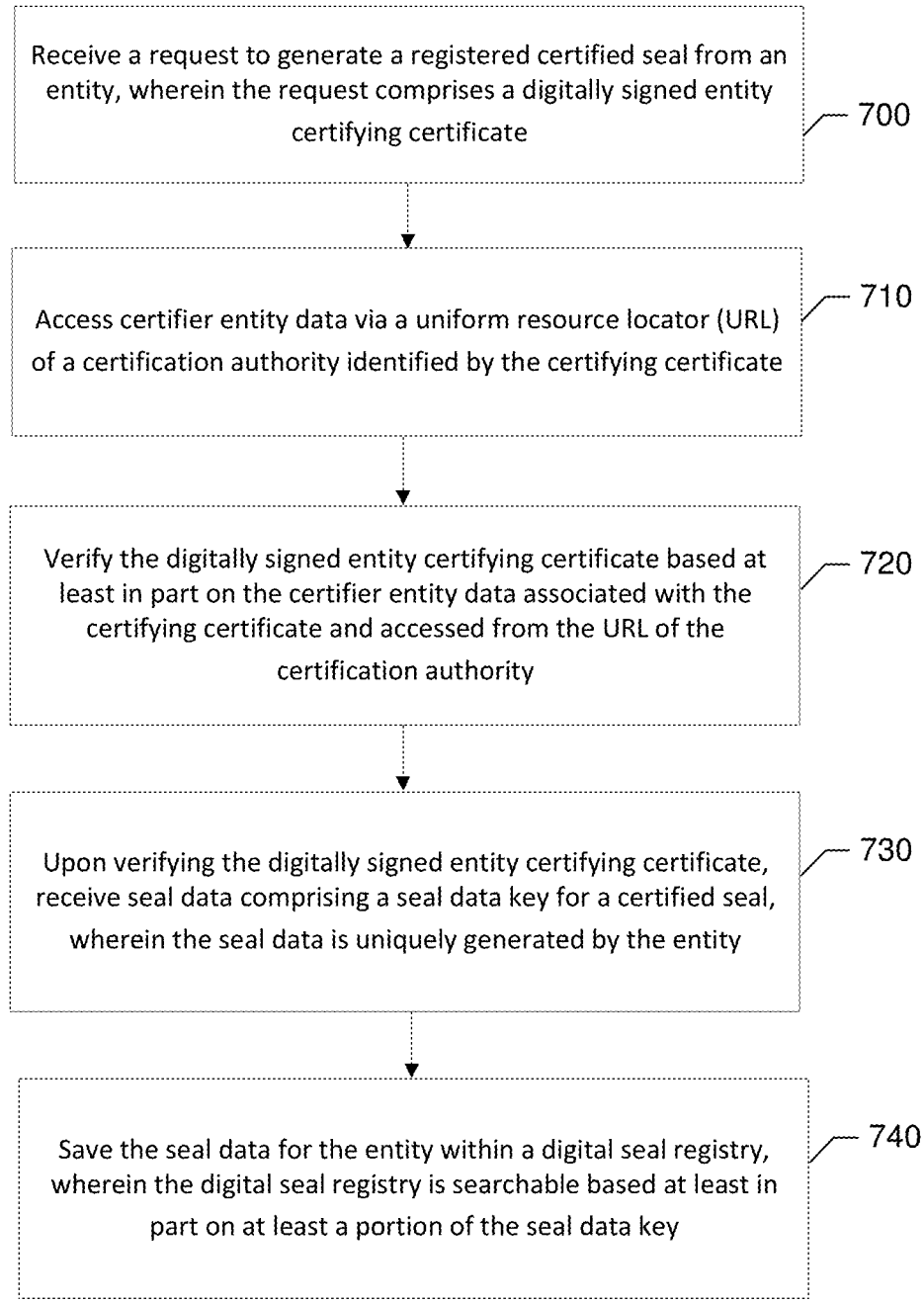
Figure 8:
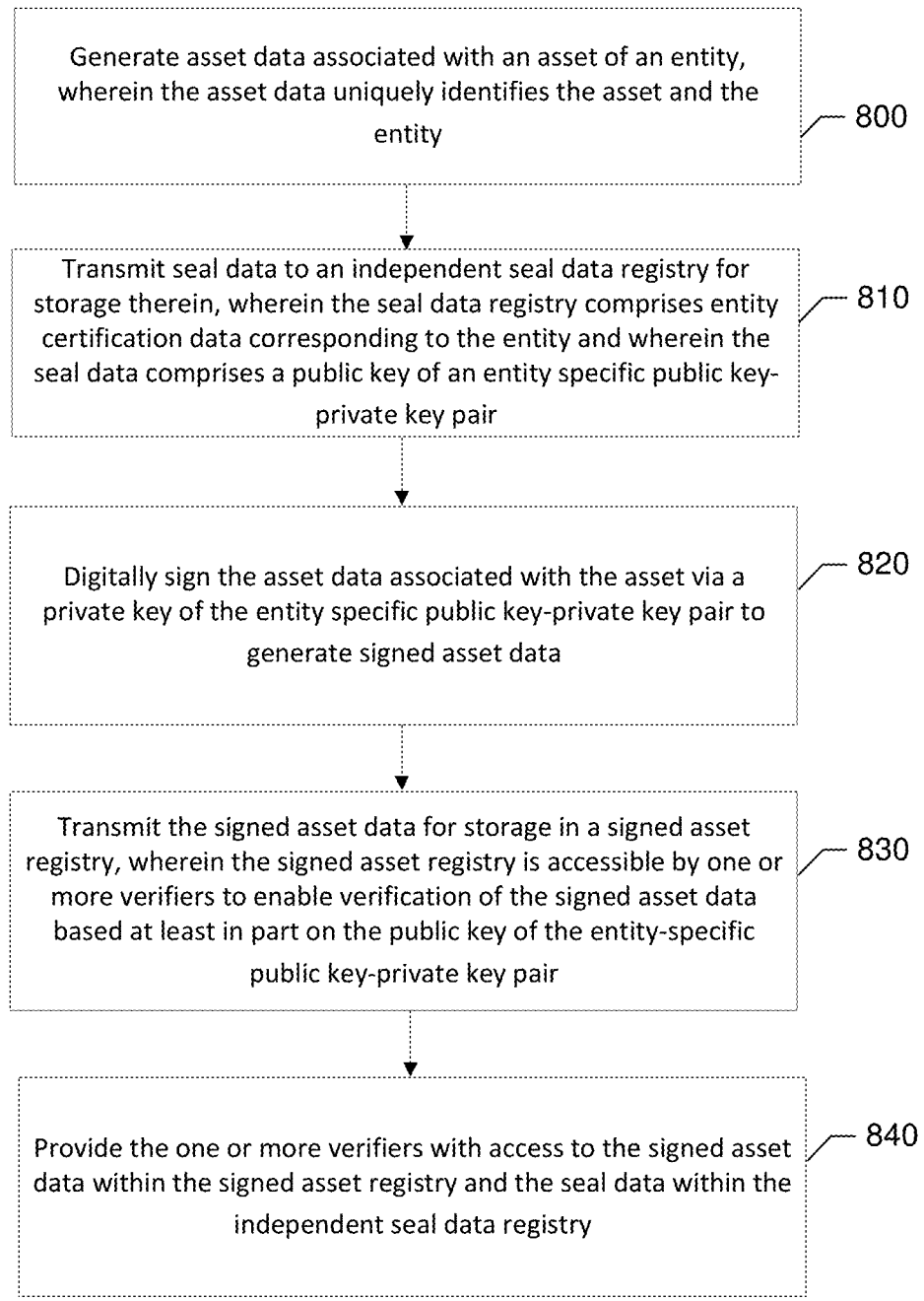
Figure 9:
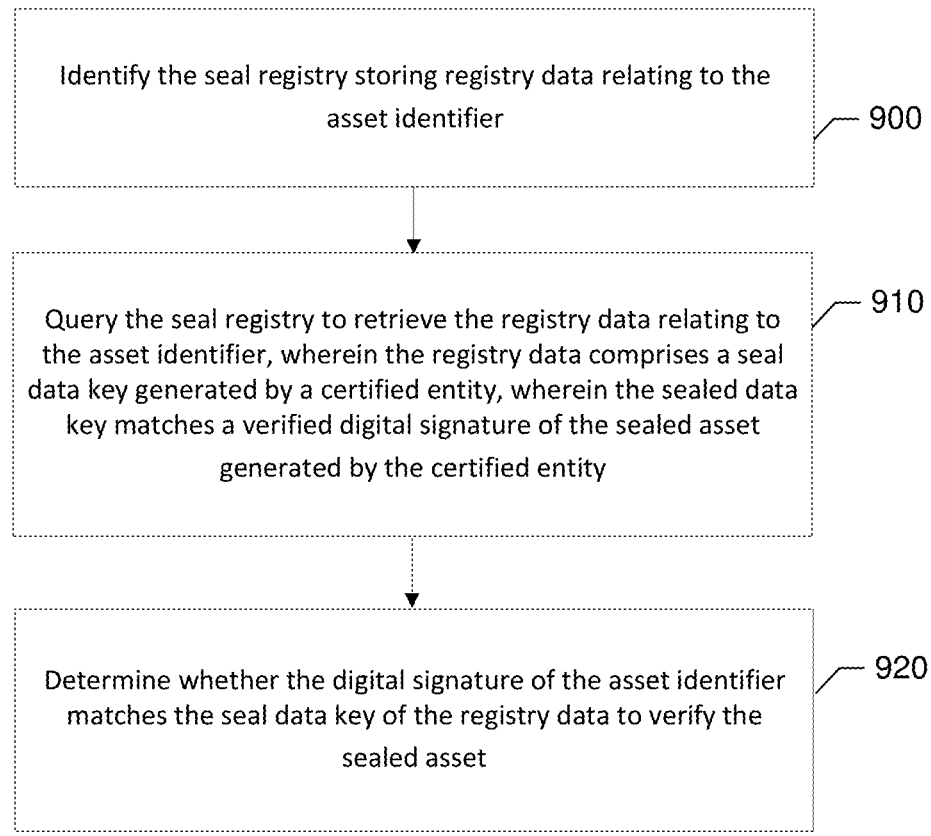

FIG. 5a. is a basic block diagram illustrating a certified seal record inside a registry entry with a RegSeal that may benefit from exemplary embodiments of the present invention;

FIG. 6 is a basic block diagram of an exemplary operational data flow depicting existing digital signature creation and verification operational steps;

FIG. 6a is a basic block diagram of an exemplary operational data flow depicting enforced digital signature creation and verification operational steps in accordance with an example embodiment of the present disclosure;

FIG. 6b is a basic block diagram of an exemplary operational data flow depicting enforced digital signature creation and verification operational steps having a double encrypted key in accordance with an example embodiment of the present disclosure;

FIGS. 7, 8, and 9 illustrate flowcharts depicting various operations performed in in accordance with an example embodiment of the present disclosure;

FIGS. 10, 11, 12, and 13 illustrate exemplary real world use cases in accordance with example embodiments of the present disclosure; and FIGS. 14, 14a, 14b, and 14c show example displays that may be presented by one or more display screens of one or more machines, sometimes referred to herein as "computing devices," in accordance with some embodiments discussed herein.

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

I. Overview

Various embodiments are directed to new and enhanced systems and methods that are easy to use and deploy by all parties, and that are transparent to all and trusted by all. Various aspects of the present invention can address the above problems, individually and collectively.

One aspect of the invention is directed to a commonly shared and hosted software as a service (SaaS) arrangement in which a digital seal registry and sealed asset registry is hosted on computing hardware such as servers and data repositories that may be maintained remotely and accessed by multiple entities (e.g., via a thin client), such as for example a web browser or app, over a network, to ensure that an asset is indeed issued by a specific entity and the asset has not been tampered with, and that the specific entity is indeed certified by a trusted entity certifier. At least one benefit of such an arrangement is that the common or distributed registries (e.g., digital seal registry, sealed asset registry) maintain data in a secure manner while also providing authentication solutions and providing a defense against unauthorized entities to query the content of the registry without knowing and being granted a lookup key beforehand.

Additionally or alternatively, there may be multiple registries distributed across public and private networks, each storing data. The multiple registries may be kept in sync so that one may register with one registry and later retrieve registration data from another registry. In another example embodiment, registries may not share data outside of a particular network domain.

Another aspect of the invention is directed to a client application commonly shared by multiple entities so that it is much easier for asset verifiers to deploy (rather than each entity creating its own version, which results in multiplication of client applications). With the combination of a common seal registry and a common verification application (to access the common or distributed seal registry via the network), any digital or physical assets can be digitized and verified with transparency, security, and ease of adoption on the same platform.

Another aspect of this disclosure provides for methods and techniques for creating digital seals, applying digital seals to assets, and verifying the sealed assets. For example, a system is provided which is configured to certify an entity and create a public-key (e.g., entity public-key) certificate (e.g., entity certificate) for the entity. In another embodiment, the system is configured for digitally signing a second public-key (e.g., a seal public key) of the certified entity along with the entity certificate to create a certified digital seal (e.g., CertSeal). The certified digital seal is then registered at a seal registry which is configured as a shared online SaaS to store and search the certified seals. Once a certified seal is registered, it may be referred to as a registered seal or a registered certified seal. Additionally or alternatively, the seal and asset data are transmitted to the verifier.

Having a registered seal and with the entity certified by a certifier entity, the entity may seal an asset(s) with the registration seal (e.g., RegSeal) by creating digital signature(s) of asset data using the seal private-key(s), and registering the sealed asset(s) at a sealed asset registry. The registered sealed asset may be searched and verified by the system.

In another aspect of this disclosure, the system provides for verification mechanisms to verify the sealed asset to make sure the corresponding registration seal signatures and the certifying entity is correct and further that the sealed asset data matches the asset to be authenticated/verified.

The applications of the digital seals include but are not limited to user identity verification, physical and digital asset identification and/or authentication, fraud detection and protection, digitizing assets of value like currencies, coupons, reward points, gift card points, credit cards, loans, stocks, futures, etc., digitizing assets and transactions, signing contracts, creating and executing smart contracts, and/or the like.

Various aspects of the present invention seek to address the aforementioned problems by providing systems and methods for digitally sealing or stamping digital or physical assets. In one aspect of the invention, a seal registry serves to unify all authentication. Another aspect of the invention is directed to digital seal or stamp creation so it cannot be faked. Also, a single, uniform client app can authenticate any assets with a digital seal. More particularly, various embodiments relate to methods for providing asset registry service to register digital or physical asset data and creating an associated digital seal or stamp by verifiable/certifiable entity(ies) that can be verified by any interested or permitted parties to prove that the asset data is truly untampered, and asset is truly issued by the said entity(ies).

Asset data (342) in certain embodiments may comprise structured data. As a non-limiting, specific example, the data may be a driver's identifying information (e.g., which may be provided in JSON format) if the asset is a driver's license. This way, the authenticated (and/or structured) data may also be processed by computer programs for various purposes like auto populating information in another system.

Terms

With reference to the following discussion, the following terms are discussed throughout the application.

As used herein, the term "entity" may be any individual, organization, company, government agency, machines or programs that can issue seals, own assets, or conduct verifications.

The terms "entity certifier," "trusted entity certifier," "certificate authority," "certification authority," and similar terms refer to an entity that issues digital certificates, similar but not limited to certificate authority or certification authority.

The terms "certified seal," "CertSeal," and similar terms may refer to a seal created by a seal owner (e.g., entity) that has been verified and certified by an entity certifier and the authenticity of the seal has been verified. In other words, a certified seal may encompass a seal signifying that the seal's content (the sealed asset) has not been tampered with and that it is exactly the same as the one issued by the seal issuer (e.g., certified entity), and the seal issuer's identity has been confirmed.

The terms "registered certified seal," "registration seal," "RegSeal," and similar terms may refer to a certified seal that is entered into a digital seal registry. Once a certified seal becomes an entry or record in the digital seal registry, the registration seal becomes accessible by verifiers.

The term "asset" may refer to something that may be verified, used, or consumed. For example, an asset may be digital (e.g., stored data, bank account, a computer account, a digital contract, an e-mail address, and/or the like), or physical (e.g., a tangible object, physical ID, diploma, passport, bag, medicine, cash, and/or the like).

The term "sealed asset" may refer to any asset that has a digital signature of a registration seal. The digital signature "seals" the asset.

The term "registered asset" may refer to any sealed asset that becomes an entry or record in the sealed asset registry. Once registered, the registered asset becomes accessible by verifiers.

The terms "seal," "digital seal" may refer to an interactive tag added to a digital asset or physical asset to serve as attestation and/or evidence of authenticity. As non-limiting examples, a seal may be a physical stamp on a piece of metal, wherein the physical stamp includes an interactive URL (uniform resource locator) connecting code, a QR code (Quick-response code) on a driver license ID, MS-tags, and/or the like. The seal may comprise and/or may be embodied as a sealed asset ID or a RegSeal ID as discussed herein. The seal may also be used separately from the asset.

The term "verifier" may refer to any computing device (e.g., operated by a user) that includes software and hardware components and program code configured to or implemented to validate the seal applied to an asset is authentic.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

III. Exemplary System Architecture

Figure 1:
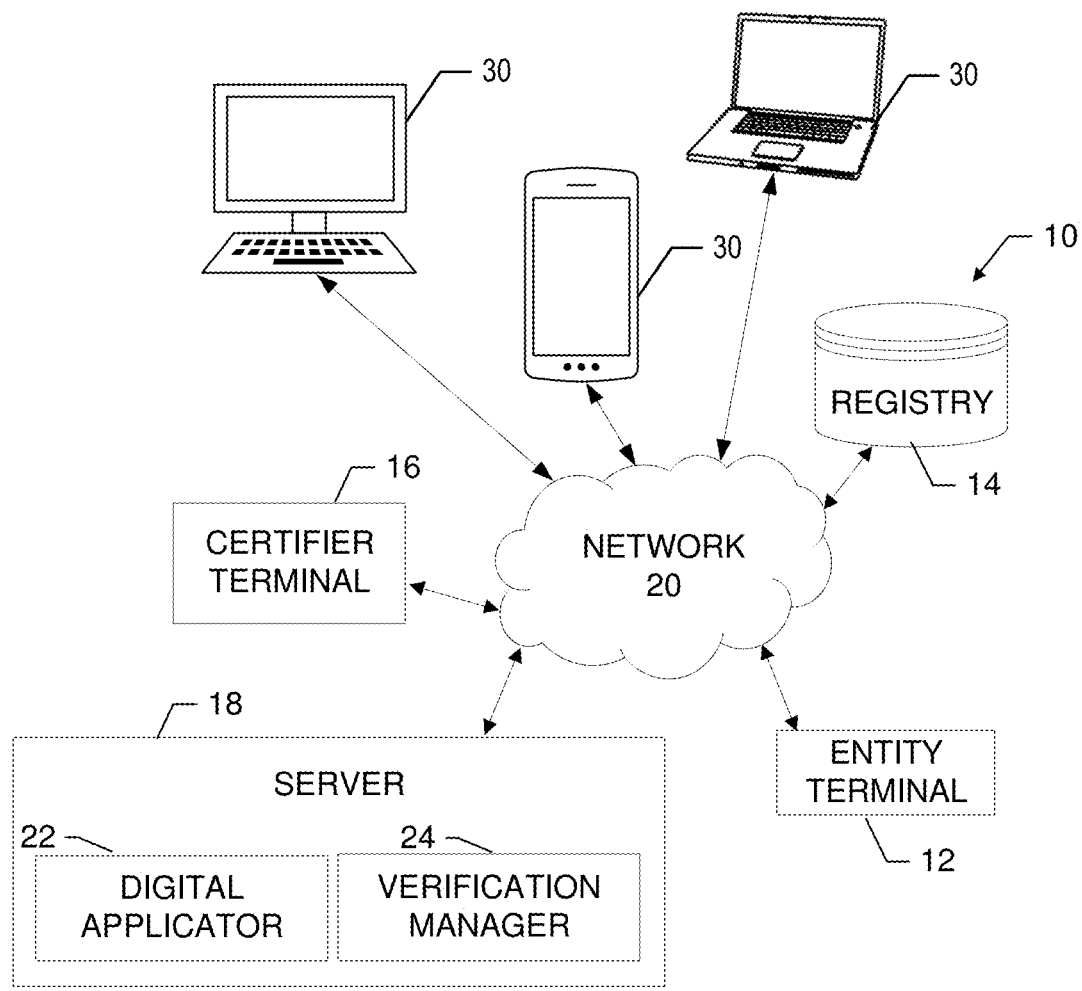
FIG. 1 is a basic block diagram illustrating a system that may benefit from exemplary embodiments of the present invention.

FIG. 1 is a basic block diagram illustrating a system 10 that may benefit from exemplary embodiments of the present invention. As shown and described herein, the system 10 could be employed in the context of a network 20 over which numerous electronic devices may communicate via wired, wireless or a combination of wired and wireless communication mechanisms. In an exemplary embodiment, the electronic devices may be embodied as personal computers (PCs) or other terminals that may enable individuals to run applications and/or communicate with each other in accordance with embodiments of the present invention. In this regard, the system 10 may include a number of different communication terminals, each of which may comprise any device or means embodied in either hardware, software, or a combination of hardware and software configured to perform one or more functions, including those attributed to the respective terminals as described herein. For example, the system 10 may include an entity terminal 12 and possibly also numerous other peripheral devices or modules in communication with each other via the network 20. In this regard, for example, server 18 may also be in communication with the entity terminal 12 via the network 20. However, it should be noted that the server 18 could also be collocated with or even a portion of the entity terminal 12. Other devices that may be in communication with the network 20 may include a registry 14 and/or at least one certifier terminal 16. However, it should be noted that the server 18 could also be collocated with or even a portion of the certifier terminal 16. The network 20 may be any of a number of different communication backbones or frameworks including, for example, the Internet, a local area network (LAN), a personal area network (PAN), a campus area network (CAN), a metropolitan area network (MAN), or the like. In one exemplary embodiment, the entity terminal 12 and the server 18 could be part of a LAN or other localized network (e.g., associated with a particular company) and one or both of the entity terminal 12 and the server 18 may be in communication with the network 20 either directly or via a gateway device of the LAN.

a. Exemplary Server

Figure 2A:
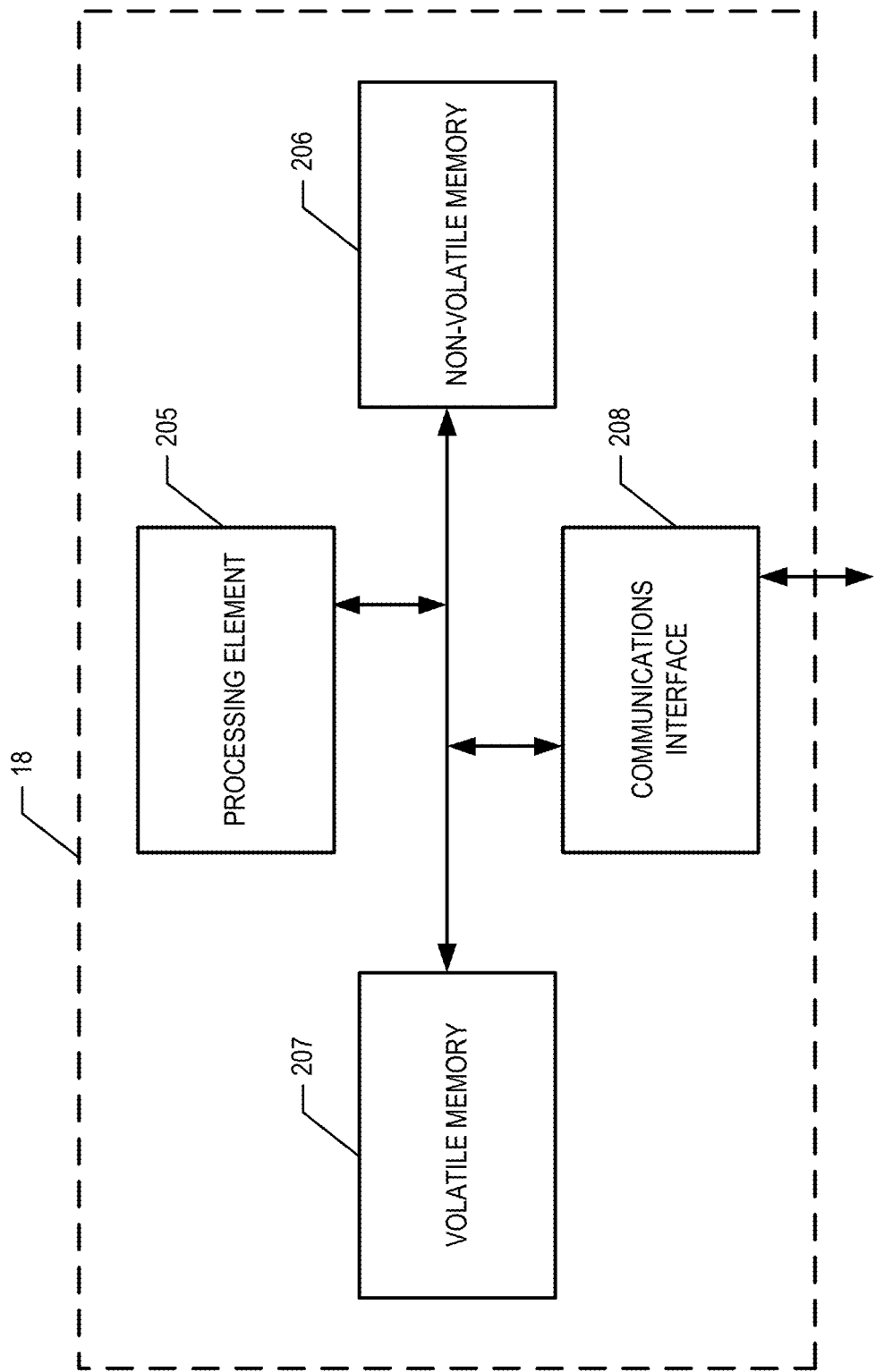
FIG. 2A illustrates a block diagram that may be specially configured in accordance with an example embodiment of the present disclosure.

The server 18 may be a server or other computing platform including memory and processing capability (e.g., the volatile memory 207 and the processing element 205 of FIG. 2A) and in communication with the network 20 in order to facilitate operation in accordance with embodiments of the present invention. In some embodiments, the server 18 may host a verification app providing access to the functionalities, devices and/or elements described in connection with the server 18 below.

FIG. 2A provides a schematic of a server 18 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with other analytic computing entities, one or more user computing entities 30, and/or the like.

As shown in FIG. 2A, in one embodiment, the server 18 may include or be in communication with one or more processing elements 205 (also referred to as processors, processing circuitry, and/or similar terms used herein interchangeably) that communicate with other elements within the server 18 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the server 18 may further include or be in communication with non-volatile media (also referred to as non-volatile storage, memory, memory storage, memory circuitry and/or similar terms used herein interchangeably). As just one example illustrated in FIG. 1, the server 18 may be in communication with a separate registry 14 (e.g., a non-volatile database storage or memory). However, it should be understood that the registry 14 may be a part of the server 18 in various embodiments. In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers (as shown in FIG. 1), or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only.

Memory media 206 may include information/data accessed and stored by the server 18 to facilitate the operations of the server 18. More specifically, memory media 206 may encompass one or more data stores configured to store information/data usable in certain embodiments.

Figure 2B:
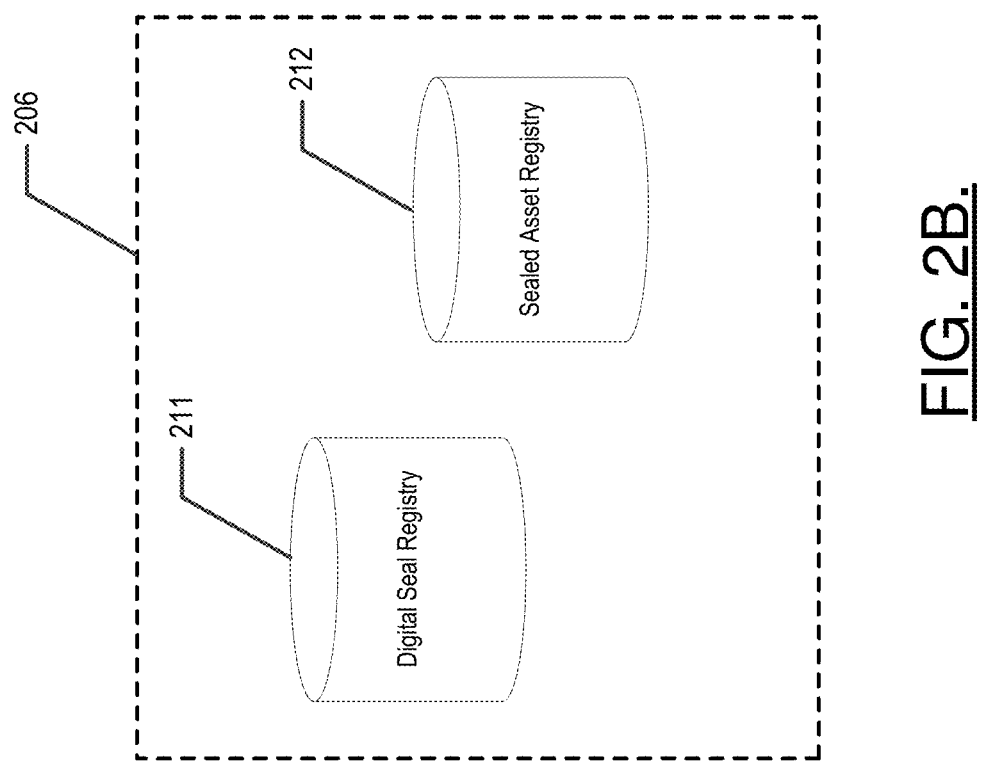
FIG. 2B illustrates a block diagram illustrating registries in accordance with an example embodiment of the present disclosure.

As illustrated in FIG. 2B, the memory media 206 may comprise digital seal registry information/data 211 having identifying information/data indicative of various entities (and their corresponding digital seals). The memory media 206 may additionally comprise sealed asset information/data 212. The sealed asset information/data 212 may comprise information/data for a sealed asset, such as the substance of a sealed asset, an asset identifier, and/or the like. It should be understood that the asset data may be stored in encrypted form such that access to the asset data may be limited to users/entities having encryption keys to access the substance of the asset data.

In one embodiment, the server 18 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the server 18 with the assistance of the processing element 205 and operating system.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 18 may communicate with computing entities or communication interfaces of other servers, terminals (e.g., certifier terminal 16; user computing entities 30), and/or the like.

As indicated, in one embodiment, the server 18 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 18 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The server 18 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other server 18 components, such as in a distributed system. Furthermore, one or more of the components may be aggregated and additional components performing functions described herein may be included in the server 18. Thus, the server 18 can be adapted to accommodate a variety of needs and circumstances.

b. Exemplary User Computing Entity

Figure 3:
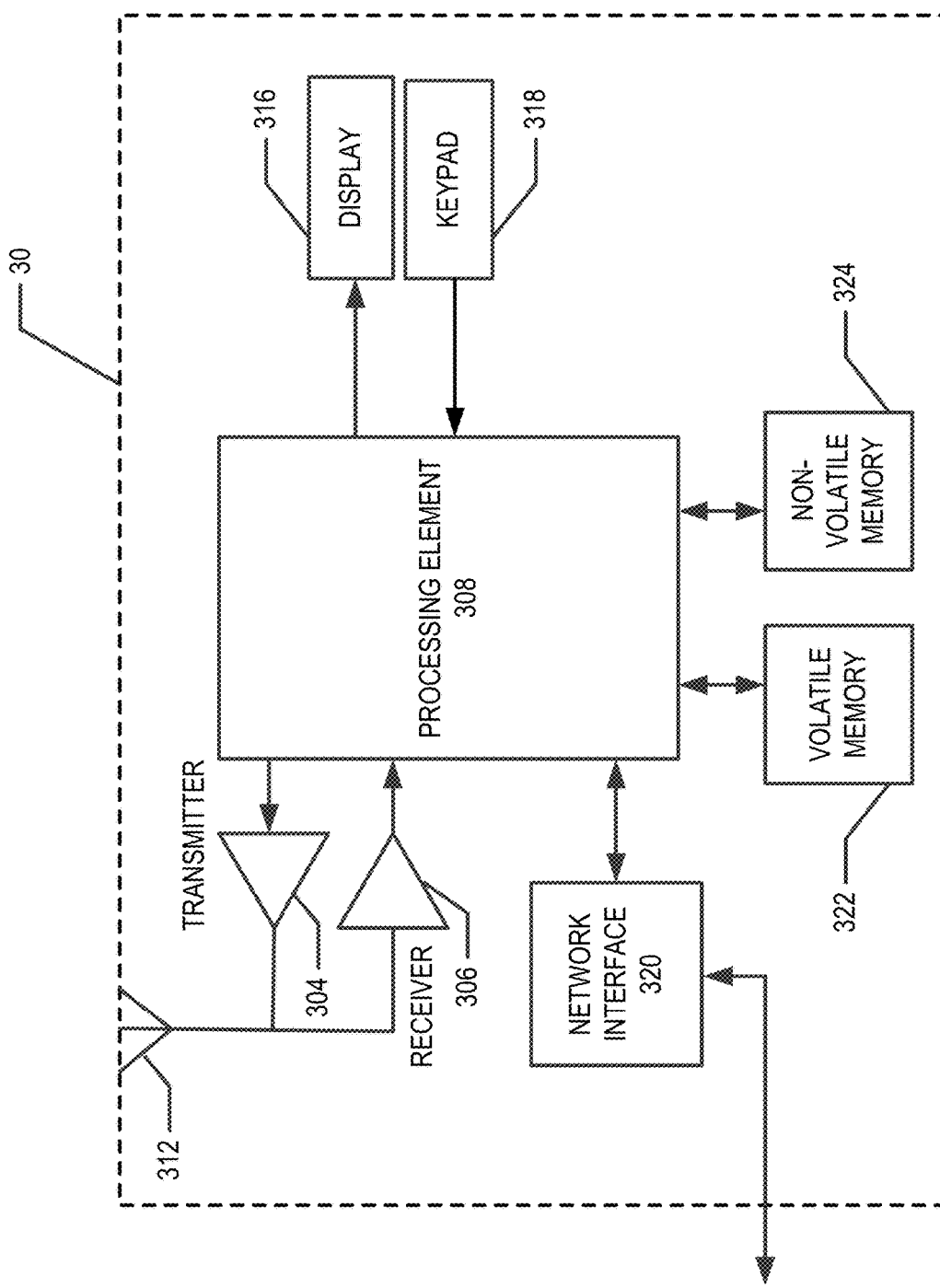
FIG. 3 illustrates a block diagram that may be specially configured in accordance with an example embodiment of the present disclosure.

FIG. 3 provides an illustrative schematic representative of user computing entity 30 that can be used in conjunction with embodiments of the present invention. As will be recognized, the user computing entity may be operated by an agent and include components and features similar to those described in conjunction with the server 18. Further, as shown in FIG. 3, the user computing entity may include additional components and features. For example, the user computing entity 30 can include an antenna 312, a transmitter 304 (e.g., radio), a receiver 306 (e.g., radio), a network interface 320, and a processing element 308 that provides signals to and receives signals from the transmitter 304 and receiver 306, respectively and/or the network interface 320. The signals provided to and received from the transmitter 304 and the receiver 306, respectively, may include signaling information/data in accordance with an air interface standard of applicable wireless systems to communicate with various entities, such as server 18, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wired or wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the server 18. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Terminals

In various embodiments, terminals, such as certifier terminal 16 and/or entity terminal 12 may have a configuration similar to the server 18 discussed above. These terminals may be operated by and/or accessible to (e.g., via user computing entities 30) various users and/or may be configured to provide various functionalities as discussed herein. For example, a certifier terminal 16 may be associated with a third party and may be configured for certifying the identity of an entity.

In embodiments where a user computing entity 30 is a mobile device, such as a smart phone or tablet, the entity terminal 12 may execute an "app" to interact with the server 18 and/or an entity terminal 12. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

In an exemplary embodiment, the entity terminal 12 may be utilized to prepare, modify, review, transact or otherwise interface with asset data (e.g., data related to an asset, like the asset itself if it is digital, images, links to data of the asset, digital hash(es) of asset data, digital signature of asset data, etc.) which may be stored as corresponding asset data files. For example, a car title may be stored at the entity terminal 12, for example, by a user or entity associated with the entity terminal 12 and stored as a corresponding asset file. The car title may be created by another entity such as, for example, the Department of Motor Vehicles (DMV) with the certifier terminal 16. As yet another alternative, the asset file could be downloaded from the certifier terminal 16 (e.g., via the Internet). The asset file could be stored at the memory device 33 of any one of the terminals and/or an asset registry along with other asset files. The car title, which may be stored, for example, in a PDF format or a local/proprietary format associated with an application used to create the car title, may be shared electronically among various parties via the network 20.

In an example embodiment, the entity terminal 12 may be configured to generate and/or to apply a seal (e.g., physical stamp such as a QR code or an ID that links to the sealed asset entry) to the car title to serve as attestation or evidence of authenticity. The seal applied may be a seal bestowed upon the user or entity by the certifier terminal (e.g., DMV or a professional association) which has certified that the user or entity is the owner of the car title. Accordingly, by signing and sealing the seal, the user or entity takes professional responsibility for the contents of the asset file. As such, although the asset file comprising the car title could be shared electronically via the network 20 (e.g., between the entity terminal 12, the certifier terminal 16, and/or one or more third party terminals (not shown)), the car title could not be relied upon (e.g., authenticated) unless the asset file is signed and sealed by the user or entity.

The entity terminal 12 may further, via the server 18, register the now certified seal (i.e., owner/entity identity confirmed). By registering the certified seal, the entity terminal 12 establishes that an un-tampered asset is loaded into the registry 14 and once verified, the certified seal may be verified by any third party via a verification manager 24 of server 18.

After establishing the certified seal, the entity terminal 12 may further apply the certified seal to an asset (e.g., car title) to identify the asset as a sealed asset. The terminal 12, via the server 18, may further register the sealed asset and thus, establish that a certified asset is loaded into the registry 14.

Embodiments of the present invention provide security measures that enable the entity terminal 12 to digitally sign and seal the car title and thereafter create a sealed asset having the signature and seal of the signer/sealer of the document (e.g., the entity). Furthermore, embodiments of the present invention provide a mechanism by which the entity may be verified as being certified by a certification authority to ensure that the digital asset is authentic. Some embodiments further provide for a commonly shared registry 14 by multiple parties to ensure that a specific digital asset is indeed issued by the said entity and the digital asset has not been tampered with, and the entity is indeed certified by a trusted entity certifier (e.g. certification authority). In another example embodiment, it is impossible for other parties or entities to query the content of the registry without knowing a lookup key beforehand as will be further described in detail below.

In an example embodiment, the commonly shared registry comprises entries/records that are unique and unrelated. A security measure implemented may include configuring the commonly shared registries to fetch data by the seal ID and/or asset ID.

The entity terminal 12 may be a terminal associated with a particular entity or a business enterprise affiliated with a particular entity. The certifier terminal 16 may be associated with a certification authority, or other third party authorized to certify the entity. Embodiments of the present invention may enable the entity terminal 12 to associate a physical or digital asset having a digitally applied signature and seal associated with the certified entity from a sealed asset registered in a central registry. In this regard, the entity terminal 12 may include or otherwise be in communication with a digital applicator 22 of server 18.

The digital applicator 22 may be any means such as a device or circuitry embodied in hardware, software, or a combination of hardware and software that is configured to apply a digital signature and seal in accordance with exemplary embodiments of the present invention as described in greater detail below. The digital applicator 22 may operate under the control of (or even be embodied as) the processing element 205. In some embodiments, such as the embodiment shown in FIG. 1, the digital applicator 22 may be embodied in software at the server 18. As such, the entity terminal 12 may communicate with the digital applicator 22 in a client/server environment in order to access digital signature and seal services from the server 18 for the generation, certification, and registration of not only a seal, but also the registration of a sealed asset (e.g. asset having a digital signature of the registered seal).

One function that may be selected in association with a physical or digital asset may be to register the asset having the signature and seal of the certified entity thereon. In other words, one function may be to create a digital seal, certify said seal, and register the certified seal. Thereafter, using the registered certified seal to sign an asset, and registering the sealed asset to the registry 10. Accordingly, for a selected physical or digital asset, a particular option may be selected from the user interface or control console to cause the digital applicator 22 to apply a digital seal and signature to the corresponding asset. When the entity instructs the application of the digital seal and signature, the digital applicator 22 may, for example, retrieve data about the seal and signature associated with the certified entity and create a certified digital seal that is shared online to a seal registry. The asset is then sealed and registered with the registered seal having the corresponding asset data along with the seal and signature of the certified entity. A current date stamp may also be applied to the asset along with the registered seal. According to exemplary embodiments, after the registered seal is applied to create the sealed asset using seal private key(s), the sealed asset is registered at a common or distributed registry so that the asset is searchable. As such, the sealed asset may be verified to make sure the corresponding registered seal and certified entity are correct and that the sealed asset data matches the asset to be verified.

In another example embodiment, if a verifier (e.g., third party or consumer) is reviewing the asset, the verifier can verify the authenticity of the asset by a verification service provided by server 18. The verifier may be in communication with a verification manager 24 of server 18.

The verification manager 24 may be any means such as a device or circuitry embodied in hardware, software, or a combination of hardware and software that is configured to verify a sealed asset in accordance with exemplary embodiments of the present invention as described in greater detail below. The verification manager 24 may operate under the control of (or even be embodied as) the processing element 26. In some embodiments, such as the embodiment shown in FIG. 1, the verification manager 24 may be embodied in software at the server 18. As such, the entity terminal 12 may communicate with the verification manager 24 in a client/server environment in order to access verification services from the server 18 for the verification of a sealed asset.

In an example embodiment, the entity terminal 12 may provide to the verification manager 24 the unique identifier of the asset (e.g., asset ID) to which the verification manager 24 uses the asset ID to fetch the sealed asset record from the registry to verify the information in the sealed asset record. In an example embodiment, the asset ID may comprise, for example, letters including the 26 alphabet letters from 'A' to 'Z', the 10 numbers from '0' to '9', the 13 special characters from !' to '=', and so on as long as the asset ID is unique.

In an example embodiment, the verification manager 24 may then be linked to the storage location (e.g., registry) of the sealed asset to verify whether the sealed asset is indeed authentic and having a certified entity attached. Alternatively, if the third party or customer is in receipt of or otherwise aware of an ID associated with the sealed asset, the third party or customer may type the sealed asset ID into an app in connection with the verification manager 24 in order to access the sealed asset for verification purposes.

In order to ensure security with regard to the granting of access to the registry and sealed asset ID, the verification manager 24 and/or the information server 18 may include an application, which may be any means such as a device or circuitry embodied in hardware, software, or a combination of hardware and software that is configured to provide authentication services to ensure the identity of the third party to enabling the third party to access services of the verification manager 24. The application may, for example, require the third party user to login by providing a username or other identification and a corresponding password or code. In this regard, the application may provide for the maintenance of separate accounts or records associated with each third party user.

In an exemplary embodiment, the entity terminal 12 (or another terminal) may further include other peripherals and/or devices. For example, the entity terminal 12 may include a security device. In an exemplary embodiment, the security device may be any means such as a device or circuitry embodied in hardware, software, or a combination of hardware and software that is configured to provide an additional layer of security for the purpose of identifying a particular entity. In some embodiments, the security device may be a private/public key pair, magnetic card reader, a radio frequency identification (RFID) reader, a biometric identification device, and/or the like. Accordingly, a magnetic card, RFID tag or merely physiological or behavioral traits associated with the particular entity may be used to assist in identifying and authenticating the particular entity prior to granting the particular entity certification and access to the services of the digital applicator 22.

Accordingly, some embodiments may include at least two security levels for access to and sealing and registering functions. Thus, for example, in order for the entity to sign and seal an asset, the entity may be required to provide a login and password to pass a security check by the digital applicator 22 and provide further evidence of identity in relation to possession of a key, access card (e.g., magnetic or RFID), or other indicia of identity (e.g., multi-factor authentication) to pass a security check by the security device. As described in greater detail below, still further security may also be provided.

d. Exemplary Networks

In one embodiment, the networks 20 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 20 may have any suitable communication range associated therewith and may include, for example, global networks (e.g., the Internet), MANs, WANs, LANs, or PANs. In addition, the networks 20 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary System Operation

Reference will now be made to FIGS. 3, 4, 5, and 6, which illustrates various functionalities performed by the computing entities discussed herein. Certain embodiments as discussed herein utilize public-key cryptography, although other encryption methodologies may be utilized in certain embodiments. Public-key cryptography may be utilized for generating digital signatures and/or for authentication. Public-key encryption and/or digital signature schemes may be used include, without limitation, Rivest-Shamir-Adelman (RSA), Elliptic Curve, Quantum Safe algorithms, and/or the like. Encryption strength may be selected based at least in part on the selected encryption scheme and/or security requirements utilized.

a. Creating Digital Seals

Figure 3A:
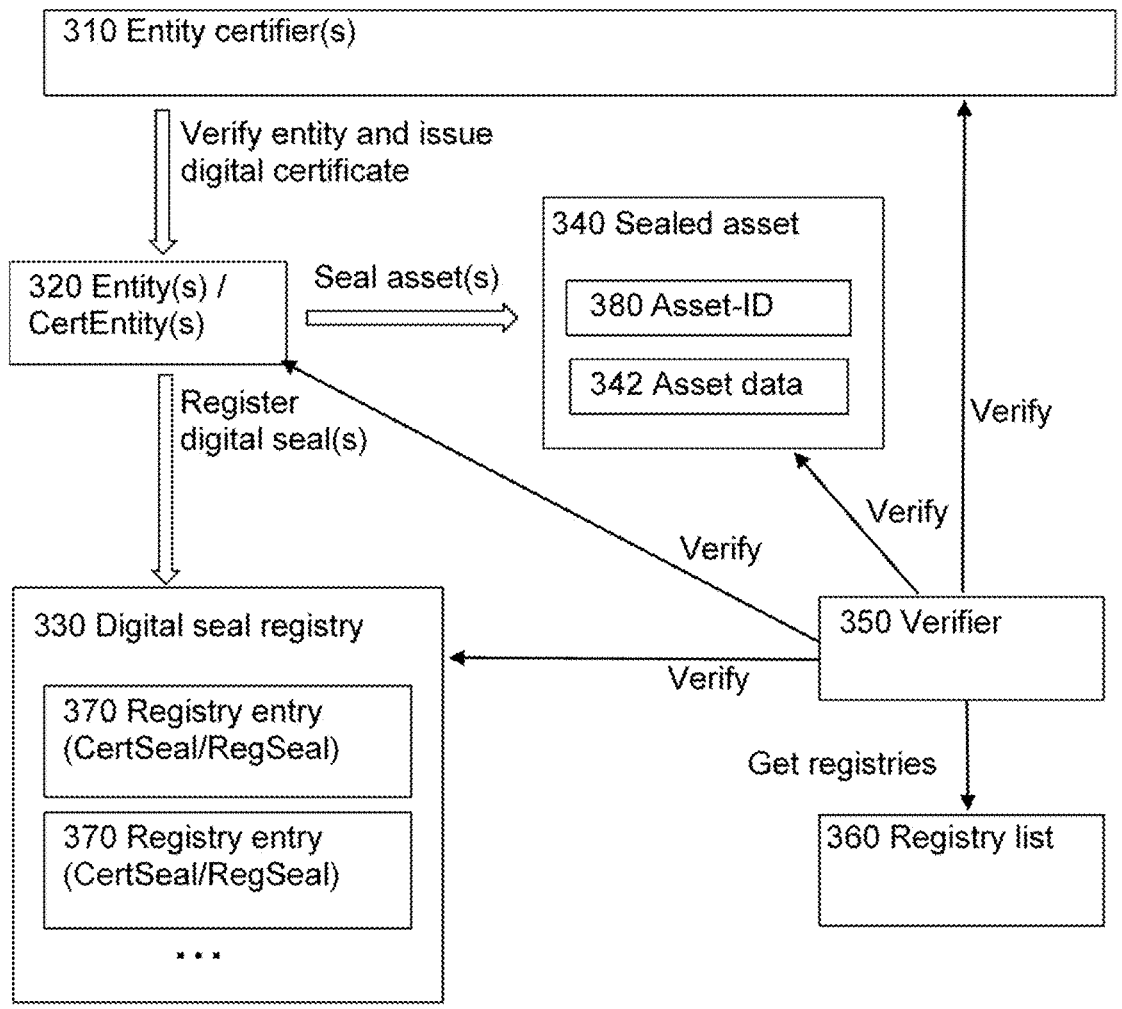
FIG. 3A illustrates a basic block diagram of an exemplary operational data flow depicting operation steps for registering a seal of a certified entity, sealing an asset with the registered seal, and verifying the sealed asset.

FIG. 3a illustrates an operational data flow diagram depicting operational steps for, registering a seal, sealing an asset, and verifying the sealed asset with an entity certifier(s) 310, entity/certified entity 320, digital seal registry 330, sealed asset 340, verifier 350, and registry list 360 in accordance with an example embodiment of the present disclosure. Of note, FIG. 3a is illustrative of one exemplary embodiment and therefore additional operations may be performed or some operations may be omitted in some alternative embodiments.

i. Verify Entity and Issue Digital Certificate

Referring now to FIG. 3a, a workflow may begin at entity certifier 310 in which the entity certifier 310 verifies the entity 320 and issues a digital certificate thus certifying the entity 320. In this regard, entity certifier 310 verifies the credentials of an entity 320 and issues a corresponding seal of certification to the entity 320 upon verification.

In order to become a "verified entity" or a "certified entity", each entity must comply with requirements set by an entity certifier 310 or an entity issuer. For example, entity certifier 310 might, for example, verify that entity 320 is a legitimate business merchant that complies with, or agrees to conform to, certain standards. For example, entity certifier 310 can be an organization that verifies entities compliance with privacy or security requirements. Alternatively, for example, entity certifier 310 may perform a nominal amount of certification before issuing the digital certificate such as verifying the contact information, manufacturing, production or sales facilities, tax ID, address, registration, license, SSN, email, phone, biometrics, individual identity, private/public keys installed on computing devices and in software applications, or any combinations of these.

In an example embodiment, the entity certifier may be the entity 320 itself and as such, providing self-certifying services or a certificate authority. Additionally or alternatively, the entity certifier 310 may be a government agency, pretty good privacy (PGP) program, a blockchain, or another entity that can verify or be trusted to verify the identity of an entity. In another example embodiment, the entity certifier 310 can be a hierarchy of certifiers, with the signing public keys of the root certifiers available to the public. One certified entity certificate may require multiple certifiers to sign digitally if a higher level of certainty is required. Once an entity is certified by the certifier 310, it is referred to herein as a certified entity 320.

In an example embodiment, the entity 320 may already own a digital seal (e.g., a public key, which may be represented as a QR code) or the seal is generated by the digital application 22. For example, the entity 320 may transmit their digital seal for certification by the digital application 22.

In an example embodiment, in order to enforce the integrity, confidentiality and authenticity of digital signatures and digital seals, the certifier 310 may be any means such as a device or circuitry embodied in hardware, software, or a combination of hardware and software that is configured to provide a certification of the seal and signature applied by the digital applicator 22. Typically the entity 320 creates a private/public key pair and the certifier 310 digitally signs the public key created by the entity plus entity identity data to create a public-key certificate using the certificate issuer's own private key. The entity keeps its private key secret.

Data indicative of the certification of the entity's 320 identity may be traced back to the certifier 310 (e.g., a root certificate provided via the certifier 310) to establish trust that the entity's 320 identity has been certified by a trusted, third party certifier 310. Data utilized to trace the certifier's data may be provided within the digital seal, and/or may be accessed based at least in part on data provided with the digital seal.

ii. Create Certified Seal

In an exemplary embodiment, the certifier 310 may act as an intermediate certificate authority to certify seals and signatures. In this regard, for example, the certifier 310 may utilize a cryptographic protocol (e.g., secure sockets layer (SSL)) and issue a certificate to accompany any seal and signature applied by the digital applicator 22. In one embodiment, digital applicator 22 may be configured to convert a digital electronic seal and signature into a verifiable seal and signature through the certifier 310. The certificate issued by the certifier 310 may be used to further verify the authenticity of the seal and signature to provide asset integrity for the asset. Furthermore, in an exemplary embodiment, the certifier 310 may be enabled to request a certificate from an outside agency to include instead of or in addition to the certificate otherwise issued by the certifier 310. In this regard, for example, if a professional agency or other certifying agency provides a particular certificate to illustrate that a particular digital seal and signature is authentic, the certifier 310 may communicate with an entity at the professional agency to indicate that a trusted certificate authority verification of the digital seal and signature issued by the digital applicator 22 has been completed and request that the particular certificate be issued to the certificate issuer for inclusion in the asset as further evidence of the authenticity of the signature and seal thereon and as evidence that requirements of the professional agency or outside agency have also been met.

In an example embodiment, the entity certifier 310 may receive a certified entity certificate issuance request from the entity 320, wherein the request comprises at least one unique identifier for the entity and a public key of a private key/public key pair. Thereafter, the certifier 310 may determine whether or not the entity is authentic based on the at least one unique identifier and after determining that the entity is authentic, digitally sign identity entity data comprising the at least one unique identifier with the private key to generate the certified entity certificate. In other words, the certifier 310 digitally signs the public key received and created by the entity 320 and the entity data to create the certified entity certificate 460 as shown in FIG. 4.

Figure 4:
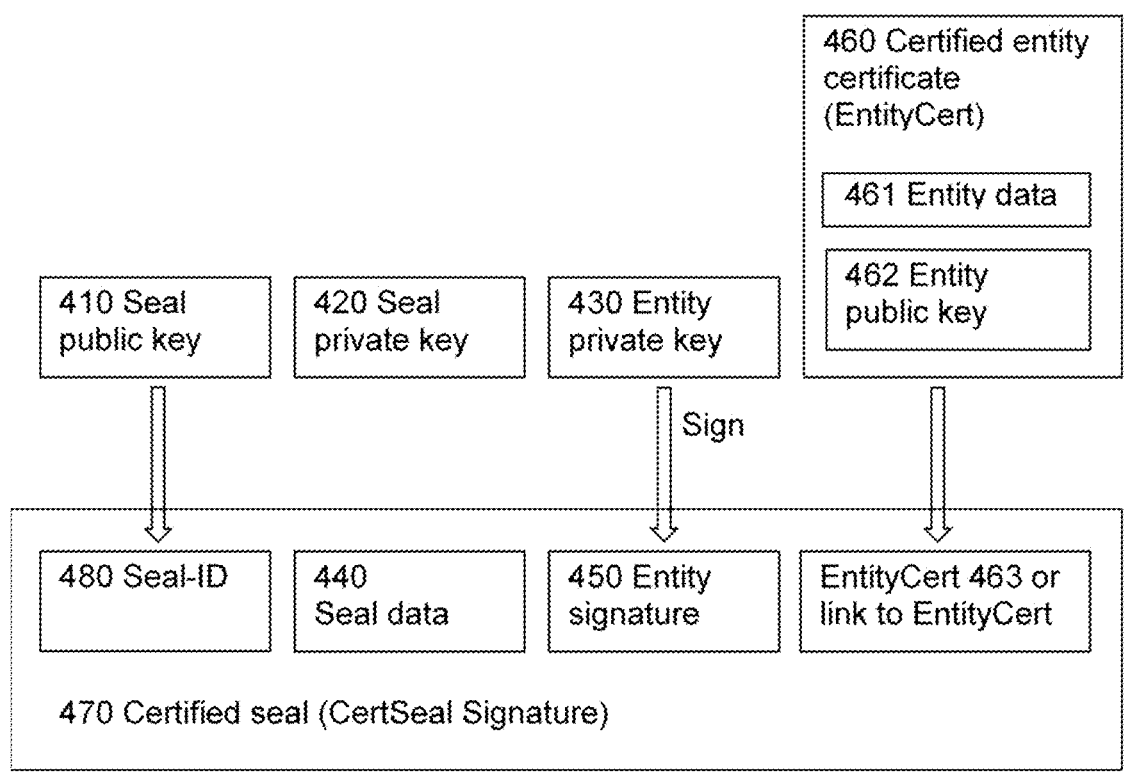
FIG. 4 is a basic block diagram illustrating a certified seal record that may benefit from exemplary embodiments of the present invention.

To acquire a certified seal, the entity 320 creates another public/private key pair as shown in FIG. 4 as seal public key 410 and seal private key 420. In an example embodiment, the entity 320 may transmit selected seal data to the digital application 22. The selected seal data may include what the seal is used for (e.g., certifying a manufacturer of a drug), the type and/or category of seal (e.g., to certify a drug source, to certify the authenticity of a diploma, and/or the like), how the seal is used (e.g., providing instructions for limitation and/or other procedures), and/or a time range the seal is valid (e.g., one week, twenty-four hours).

In an example embodiment, the seal public key 410 itself or the public key 410 and some of the selected seal data 440 is used as a seal ID 480. The seal ID 480 is used to uniquely identify the certified seal. As used herein, a "seal data key" may refer to the seal ID used to uniquely identify the certified seal. To create the certified seal 470, the digital application 22 digitally signs the seal ID 480 and seal data 440 with the corresponding private key 430 of the certified entity 460 to create the digital signature 450 of the certified entity 320.

In an example embodiment, the entity certificate 460 bestowed to the certified entity by the certification authority may comprise a link or the entity certificate itself 463 that is stored in the certified seal 470.

Additionally or alternatively, the digital application 22 may use another certified seal 470 to create another certified seal instead of using the entity certificate 460 and its corresponding entity private key 430.

iii. Register Certified Seal

The digital application 22 then registers the certified seal 470 to the digital seal registry 330 as shown in FIG. 3, as registry entries 370 having a certified seal/registered seal. Once a certified seal 470 is registered it may be referred to as a registration seal. The registration seal may be searchable by its seal ID 480, which is associated with the corresponding registry entry 370 from the digital seal registry 330. At any point, the registration seal may be revoked by the certified entity 320 with its entity signature 450.

In an example embodiment, the registration seal is searchable by its seal ID 480 from the digital seal registry 330. There can be one or multiple online services serving as digital seal registries 211 and these registries can exchange registered records. A registration seal can be revoked by its certified entity with a digital signature 450 of the certified entity 320.

A registry can be open to the public or kept private. An advantage of one or more connected public registries is that the applications can be unified to one platform. A digital seal registry 330 configured as shown in FIG. 3A uses server 18 to manage the operations of the registry and its records or entries 370.

b. Sealing an Asset

To create the sealed asset 340, the entity 320, via the digital application 22 may digitally sign an asset ID 380 or a seal ID of an asset with a corresponding seal private key 420 of the seal public key 410 in the certified seal/registered seal 470 resulting in a sealed asset 500 having a registered seal signature 530. The signed sealed asset and its corresponding seal ID 480 is then saved to the registry as a single registry entry comprising sealed asset 500. In an example embodiment, the registry may be managed by the certified entity with a link provided to the verifier to fetch the asset and/or seal. Having a sealed asset provides verification that the asset ID 510 and the asset data 520 are sealed by the entity certificate 460 with the registration seal signature 530 of the certified seal/registered seal 470 having seal ID 580. In other words, no other entity can claim that the sealed asset is sealed by them. The asset ID 510 can be a new ID like a public key or a random number, or the seal public key 410 in FIG. 4 of the certified seal 470, or the seal public key 410 plus some asset data 342. A sealed asset 340 may be searchable by its asset ID 380 or seal ID to get the sealed asset record 500.

Additionally or alternatively, to seal the asset, the asset data 520a may be entered in the registry entry of the certified seal/registration seal 370 that is used to seal the asset. This combines the sealed asset record 500 with the certified seal record 470 as shown by asset registry entry/sealed asset 510a. The seal ID 480 of the certified seal 470 can be used as the asset ID (seal ID/asset ID 580a) as in FIG. 5a. To accomplish this, the digital applicator 22 digitally sign the seal ID 480 and asset data 520a with the certified entity certificate 460 resulting in an entity signature 550a then digitally sign the entity signature 450 with the entity certificate 470 to create the certified seal (CertSeal) signature 530a. In this case, the certified entity certificate 560a is either attached to the record 510a (e.g., asset registry entry/sealed asset), or a link to it is provided, so entity signature 550a can be verified. The public-key for verifying the CertSeal signature 530a is either the Seal_ID 580a, or derived from it.

For physical sealed assets that are consumable, such as wine, medicine, food, and/or the like, one Seal-ID/Asset-ID may be positioned on the outside of the asset/packaging. A second Seal-ID may be positioned inside the asset/packaging. In such embodiments, it is more effective if each Seal-ID is only used once. For a counterfeiter it is most cost effective to copy both of the outside and inside seals in batches. If one of the inside seal is verified then the whole batch can be known to be counterfeit with a high level of certainty.

c. Enforcing Digital Signature Verification

The existing, current digital signature and verification processes are illustrated in FIG. 6. As shown in FIG. 6, the process for creating a digital signature, using a pair of public/private keys for a document or data 610 is to first calculate a digital hash 620 of data 610, and then encrypt the resulting hash 620 with the private key to create the encrypted hash 630. Normally the data 610 and the encrypted hash 630 are stored together (e.g., in association with one another) and referred to as a digitally signed document. The corresponding public key 602 may also be stored with the digitally signed document, either with a digital certificate to prove the identity of the key owner, or the public key and owner which are well known to the public. As shown in FIG. 6, to verify the digital signature, first, the public key or certificate 602 is used to decrypt the encrypted hash 630 to get the decrypted signature 640, then the hash 620 of the data 610 is calculated using the same algorithm as in the creation of the digital signature, and lastly, the hash 620 is compared with the decrypted signature 640, the digital signature is determined to be valid if they are the same.

However, a problem with the above approach is that there is no proof that the digital signature is ever verified. Any entity can take the data 610 from a digitally signed document and claim that they have verified the attached digital signature.

To solve the above mentioned problem various embodiments provide for enforcing digital signature verification as shown in FIG. 6a. The present disclosure may utilize one or more of public-key cryptography, digital signatures, symmetrical encryption, and hash calculation. Additionally or alternatively, quantum computing safe algorithms may also be utilized. Encryption strength can be selected based on the scheme used and security requirements.

Referring to FIG. 6a, the operational steps include first calculating the hash 620a of data 610a using a cryptographic hash function. Thereafter, encrypting data 610a with the above calculated hash 620a as the key to get the encrypted data 640a. Next, encrypting the hash 620a using the private key of the signature to get the encrypted hash 630a.

The encrypted data 640a and the encrypted hash 630a are the digitally signed (encrypted) document in this embodiment. The signature public key 602a or its public key certificate can be attached with the signed document 600a as shown in FIG. 6a. The public key 602a or its public key certificate can be separate from the signed document in an example embodiment.

In order to verify the digital signature generated according to this embodiment, the verification operational steps comprise decrypting the encrypted hash 630a with the signature public key 602a to obtain the data hash 620a, decrypting the encrypted data 640a using the hash 620a from the step above, and then obtaining decrypted data 650a.

In the case where the decrypted data 650a is meaningful (e.g., not illegible as the encrypted cipher), then the digital signature is determined to be valid.

Additionally, entropy 612a (e.g., a random number) may be added to the data 610 before it is hashed to further secure the data. In an example embodiment, the size of the entropy 612a may be based at least in part on the security requirement.

Another embodiment of the present invention is to enforce digital signature verification, as shown in FIG. 6b. The operational process steps include generating an encryption key 620b. In an example embodiment, the encryption key can be a symmetric key(s) or a private/public key pair. The subsequent steps includes encrypting the data 610b to be signed with the encryption key 620b to get encrypted data 640b, calculating the hash 622b of the encrypted data 640b, encrypting the encryption key 620b with the private key of the digital signature, getting the encrypted encryption key 630b, and encrypting the above encrypted key 630b with the hash 622b to get the double encrypted key 650b.

The encrypted data 640b and the double encrypted encryption key 650b may represent the digitally signed (encrypted) document. The signature public key 602b or its public key certificate can be attached with the signed document 600b as shown in FIG. 6b. The public key or its public key certificate 602b may be separate from the signed document as well, as long as it can be located.

In an example embodiment, the method for verifying a digital signature generated according to this embodiment comprises the following operational steps as shown in FIG. 6b: calculating the hash of the encrypted data 640b to get back the encrypted data hash 622b, decrypting the double encrypted key 650b with the hash 622b derived above to get the encrypted key 630b, decrypting the encrypted encryption key 630b with the public key 602b of the signature to get back the encryption key 620b, decrypting the encrypted data 640b using the encryption key 620b from the step above resulting in getting decrypted data 650b.

In an example embodiment, the digital signature is determined to be valid if the decrypted data 650b is meaningful (e.g., not illegible or garbled).

Additionally or alternatively, the encryption key 620b can be the hash 620b in FIG. 6b of the data 610b.

In another example embodiment, the order of double encrypting an encryption key 620c to get the double encrypted key 650b can be reversed and it still works. In this case the decrypting order for verification is reversed as well.

In yet another example embodiment, the hash 622b to encrypt the public key or its certificate 602b, may be utilized instead of encrypting the encrypted key 630b. In other words, the digital signature verifier calculates the hash of the encrypted data 640b and using the public key 602b to decrypt some data before the encrypted data 640b can be decrypted to get the decrypted data 650b.

An example case of the above embodiment is that the encryption key 620b can be the hash 620a in FIG. 6a of the data 610a. The order of double encrypting an encryption key 620b to get the double encrypted key 650b may be reversed in certain embodiments. In this case, the decrypting order for verification needs to be reversed as well. Other ways of double encrypting may be provided in accordance with certain embodiments, for example, using the hash 622b to encrypt the public key or its certificate 602b, instead of encrypting the encrypted key 630b, etc. The essence is to force the digital signature verifier to calculate the hash of the encrypted data 640b and use the public key 602b to decrypt some data before the encrypted data 640b can be decrypted to get the decrypted data 610b.

c. Verifying a Sealed Asset

Returning to FIG. 3, to verify a sealed asset 340, the verification manager 24 may receive an asset identifier associated with the sealed asset. Additionally or alternatively, the verification manager may receive a seal identifier of the sealed asset. The verification manager 24 may then locate the registry or get the registry location from a well-known seal registry list service or obtain the registry location from location data embedded in the asset identifier or seal identifier (e.g., a QR code of a location URI).

The verification manager 24 may then query the registry to retrieve the record having registry data relating to the asset identifier or seal identifier. The registry data comprises a seal data key generated by a certified entity, wherein the sealed data key matches a verified digital signature of the sealed asset generated by the certified entity. Thereafter, the verification manager 24 may determine whether the digital signature of the asset identifier matches the seal data key of the registry data to verify the sealed asset.

In order words, the verification manager 24 is configured to verify the registration seal of the record is signed by the entity certificate of the correct certified entity. The verification manager 24 may further verify the entity certificate in the record certifies the correct certified entity and that the certified entity is indeed certified by the correct entity certifier. The verification manager may also verify the entity certifier is valid and/or can be trusted (e.g., via one or more matching algorithms, such as machine-learning algorithms, direct matching algorithms, and/or the like). A further verification step is implemented by the verification manager to verify the asset data in the record matches the asset being verified and/or if the RegSeal is of the correct type.

FIGS. 7, 8, and 9 are flowcharts of a system, method and computer program product according to an exemplary embodiment of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of, for example, the terminal or server and executed by its respective processing element 205. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method of generating a registered certified seal, as shown in FIG. 7, may include receiving a request to generate a registered certified seal from an entity, wherein the request comprises a digitally signed entity certifying certificate as shown in block 700.

In an exemplary embodiment, the method may include additional operations. For example, the method may further include operations of accessing certifier entity data of a certification authority identified by the certifying certificate as shown in block 710.

In block 720, the method may further comprise verifying the digitally signed entity certifying certificate based at least in part on the certifier entity data associated with the certifying certificate and accessed from the certification authority.

The method may further include operations for upon verifying the digitally signed entity certifying certificate, receive seal data comprising a seal data key for a certified seal, wherein the seal data is uniquely generated by the entity as shown in block 730.

As shown in block 740, the method further comprises saving the seal data for the entity within a digital seal registry, wherein the digital seal registry is searchable based at least in part on at least a portion of the seal data key In another embodiment, a method is provided for sealing an asset as shown in FIG. 8. The method comprising generating asset data associated with an asset of an entity, wherein the asset data uniquely identifies the asset and the entity as shown in block 800.

In an exemplary embodiment, the method may include additional operations. For example, the method may further include operations of transmitting seal data to an independent seal data registry for storage therein, wherein the seal data registry comprises entity certification data corresponding to the entity and wherein the seal data comprises a public key of an entity specific public key-private key pair as shown in block 810.

In block 820, the method further comprises digitally signing the asset data associated with the asset via a private key of the entity specific public key-private key pair to generate signed asset data.

The method further comprises transmitting the signed asset data for storage in a signed asset registry, wherein the signed asset registry is accessible by one or more verifiers to enable verification of the signed asset data based at least in part on the public key of the entity-specific public key-private key pair as shown in block 830.

In another example embodiment, the method further comprises providing the one or more verifiers with access to the signed asset data within the signed asset registry and the seal data within the independent seal data registry as shown in block 940.

As shown in FIG. 9, in yet another example embodiment, a method is provided for verifying a sealed asset in which the method comprises identify the seal registry storing registry data relating to the asset identifier (see block 900) querying the seal registry to retrieve the registry data relating to the asset identifier, wherein the registry data comprises a seal data key generated by a certified entity, wherein the sealed data key matches a verified digital signature of the sealed asset generated by the certified entity as shown in block 910.

In block 920, the method further comprises determining whether the digital signature of the asset identifier matches the seal data key of the registry data to verify the sealed asset.

In an example embodiment, the method includes means for receiving an asset seal identifier, identifying the asset registry associated with the seal identifier, looking up the registry entry or record from the asset registry, the registry entry or record associated with the seal identifier. The method further includes means for verifying the registered seal is valid and that the registration seal in the registry entry is created by a certified entity. The method also includes means for verifying that the certified entity of the registered seal is valid and certified by a certificate authority that is trusted.

The operations described above with respect to FIGS. 7, 8, and 9 are described specifically for purposes of illustration only. It should be appreciated that, in some embodiments, another authentication type may be associated with a sealed asset. Additionally, it should be appreciated that, in some embodiments, another type of registered seal may provide a corresponding level of authenticity. Accordingly, the specific embodiments illustrated in FIGS. 7, 8, and 9 should not be taken to limit the scope and spirit of the present disclosure.

It will be appreciated that certain steps illustrated in FIGS. 7, 8, and 9 may be performed by several systems, by independent systems, or by a combination of systems. Additionally or alternatively, in some embodiments, the steps alternative operations, alternative operations, and/or a different arrangement of operations may be performed by embodiments within the scope of the disclosure herein. As such, the specific flows illustrated in FIGS. 3-9 are merely exemplary, and are not for purposes of limitation.

Example Use Case 1—Medical Insurance Fraud Protection

An insurance company creates a digitally sealed asset for each of its insurance cards. The asset identifier or seal ID can be printed, for example, on a corresponding physical card as a QR code. A mobile device in communication with server 18 may read the QR code and verify with the seal registry 14 that the issuing insurance company has a registration seal that is verified and as such, the insurance card data is correct. In an example embodiment, the insurance card data itself can be saved in the asset registry record entry 500 of FIG. 5, or a link may be saved in the entry, the link to a location where the insurance card is saved. The verification manager 24 of the server 18 fetches the insurance card data from the asset registry. The card data may comprise an image of the insurance policyholder user. The user of the mobile device in communication with the verification manager may compare the fetched insurance data having an image of the policyholder with the cardholder to be certain that the insurance card is indeed issued to the correct policyholder by the insurance company, and further that the card has not been tampered with in any way. In an example embodiment, the electronic records for the verification process, the location of the mobile device, and the timestamps can be saved as proof that the insurance card and the policyholder has been verified. In an example embodiment, the insurance card can contain only the QR code of the seal ID, since all the correct data can be returned to the verifying device. For example, a digital form of the seal ID like an image on a mobile device can serve as the insurance card as well.

Any of a variety of physical cards (e.g., in a wallet) can be digitized in a manner similar to that discussed for the insurance card example above. Additionally or alternatively, biometrics such as face recognition to identify an individual may utilized by the verification manager 24. For example, a certified entity 320 may create a sealed asset 340 for an individual (See FIG. 3), which includes information about the individual. The unique characteristics of biometric data can be linked to the asset ID 380 or seal ID of a certified asset. For example, an insurance company can use the seal ID plus an insurance card type as its insurance card seal ID. The insurance card type is part of the asset data 342. The sealed insurance card can be fetched and verified by looking up at the registry 14 using the card insurance card seal ID as the key. At least one part of the card insurance card seal ID is the seal ID of the individual (e.g., entity), obtained by biometrics like face recognition. Additionally, a second part of the card seal ID may be the insurance card type. Similarly, the seal ID of an individual can be used for other types of identification purposes as well.

The registry 14 in FIG. 1 may be secured by granting permission to the verifiers 150. To accomplish this, for example, the certified entity 120 registers a separate permission RegSeal and use this RegSeal to seal a verifier application. In this case the application is a sealed asset with its own key pair. The sealed asset key pair can be used to authenticate the application and also control what data the application can access.

Example Use Case 2—Digitize Financial Assets

Figure 10:
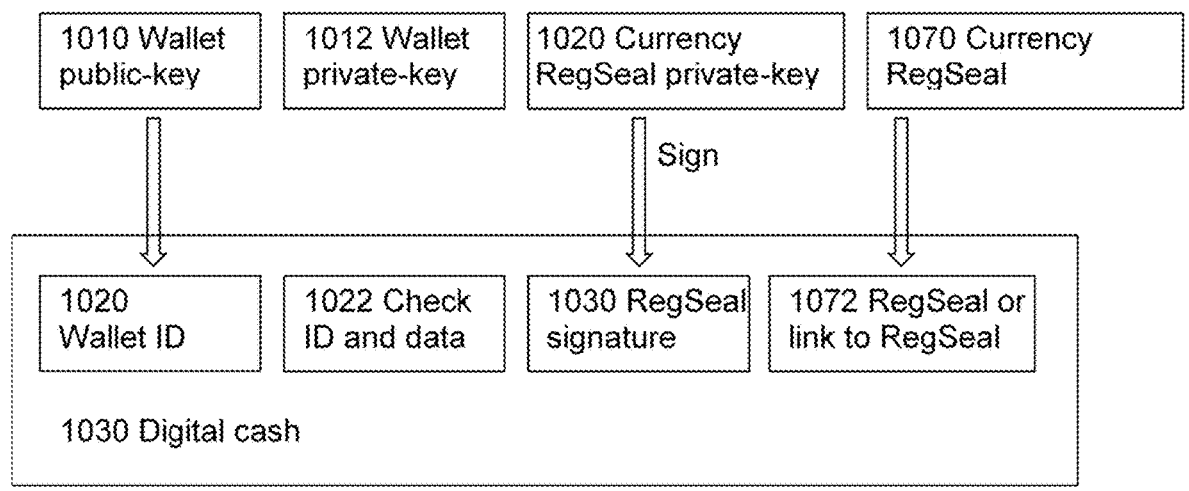
Figure 10:
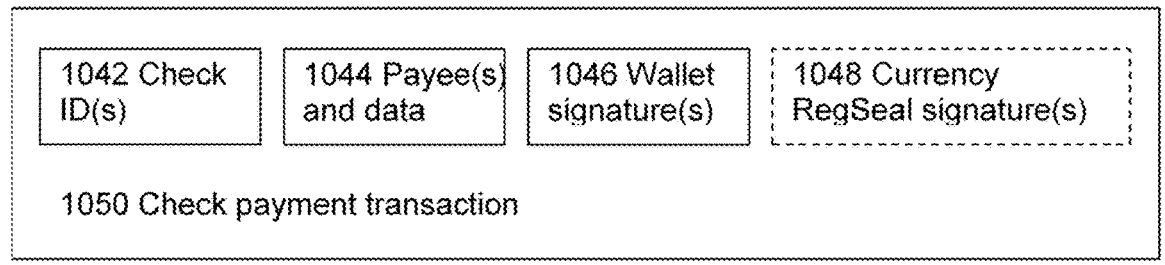

Various embodiments may be utilized to digitize financial assets (e.g., currencies) without many of the difficulties associated with Blockchain. FIG. 10 is an example depiction of digitize cash according to one embodiment where a certified bank registers a registration seal for issuing cash or checks with a process as shown in FIG. 2. For example, seal data may include the type of currency, the payment or transaction protocol supported, and other data can be registered. To issue a digital check, a customer device in communication with server 18 creates a public key-private key pair and may use the public key as his wallet ID or address. In turn, the bank creates a unique ID for the check and seals the ID, the customer's wallet ID and the check amount data (e.g., seal data) with a digital signature of the private-key of a currency seal to create a digital check record.

To spend the digital check, a payer signs the check ID, the payee's wallet ID and the check amount to create a wallet digital signature. The payee sends the signed data or payment transaction record to the bank and the bank issues a new digital check to the payee. The old check is voided by the bank. An amount leftover can be issued to the payer with a new digital check. Multiple check transactions can be completed in one payment transaction. Multiple digital signatures can be used as well to enhance the security of digital checks. Instead of digital signatures, some scripts or software programming languages can also be used, such as those provided for Bitcoin or Ethereum, to make the authentication and transaction processes more flexible and versatile.

Alternatively, instead of issuing a new digital check and cancelling the old one as described above, the bank can sign the transaction record with the currency certified seal 270 to create a digital signature 450 in the transaction. Thus signed or sealed transactions can serve as a new check(s) with the same check ID(s) and amount redistributed to new wallet(s). These sealed transactions can be submitted to the bank to exchange for new digital check. In yet other embodiments, other RegSeal(s) (corresponding to other entities) may be utilized to approve a transaction, upon approval of the original entity. In certain embodiments, the seal registry and/or asset registry may be implemented as a Blockchain according to certain implementations. In another example embodiment, another RegSeal(s) from other entities may be used to approve the transaction, as long as the original entity agrees that the other entities can seal the transaction on the original entity's behalf.

In various embodiments, first a payee has an input such as a QR code for a device of payor to read. Then the payor reads the input using a device and agrees to pay the payor. The input is linked to the payee's account. Once the payor agrees and finishes the process the payment is transferred from the payer's account to the payee's account. However, such embodiments have problems, such as an input can be replaced by a malicious party to steal payment. It is more vulnerable if the payment input (QR code) is left unattended, for example, in case of self-service bike rentals. To secure mobile device payment like this, a RegSeal may be used to sign a payment input (QR code). A payor can verify the payment input is sealed properly and its certified owner (Entity 120) of the payment input before a potential customer agrees to pay. It is not possible for anyone else to create a fake payment input and pretend to be the true owner. The verification process can be incorporated into the payment process to warn the payor if it detects a counterfeit payment input.

Figure 12:
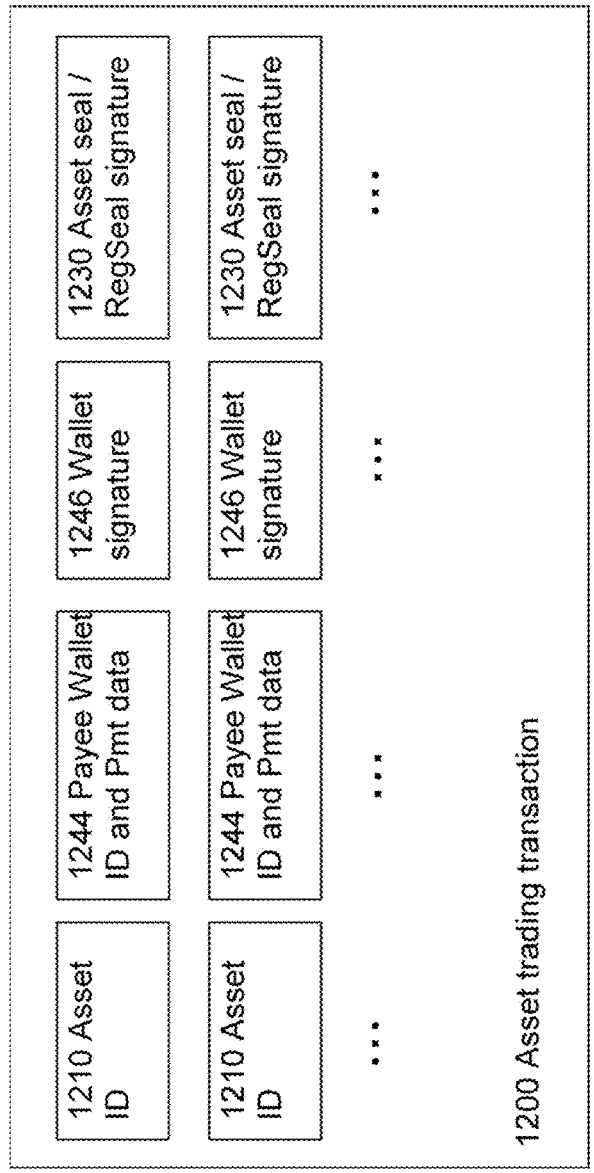

The above embodiment only serves as an example for digitizing any assets of value. The bank is also an example of any certified entities (asset issuers) for issuing a digital asset. An issued digital asset is linked to a wallet secured by one or more private/public key pairs. The issued assets are secured by the corresponding asset seals (RegSeals) of the asset issuers Example Use Case 3—Asset Transaction Digital assets issued with the same or different asset seals can be traded with the application of the corresponding seals as illustrated in FIG. 12. An asset trading transaction 1200 is composed of the asset IDs 1210, the corresponding destination wallet IDs and payment data 1244, the digital wallet signatures 1246 of the corresponding wallets to confirm that the asset or wallet owners agree to pay the payees, and the asset seal/RegSeal signature 1230 of the corresponding asset RegSeals to confirm the assets are owned by corresponding wallets and the amounts are correct and available when the transaction commits. In another example embodiment, the asset seal/RegSeal signature 1230 may be signatures of other proxy RegSeals approved by the asset RegSeals. Once the signatures of all the wallets and RegSeals are collected in the transaction record 1200, the owners can submit the transaction record 1200 to the corresponding asset issuers to exchange for new digital assets resulted from the exchange or trading.

Example Use Case 4—Smart Contract

In an example embodiment, a smart contract comprising the asset IDs 1310, the corresponding destination wallet IDs and data 1344, one or more conditions that must be met for the contract to be valid 1350, the digital signatures 1346 of the corresponding wallets to confirm that the asset or wallet owners agree to commit the transactions in the contract once the conditions are met, and the digital signatures of the corresponding asset seals 1330 of the asset issuer are used to confirm the assets are owned by corresponding wallets, the amounts are correct, and the assets will be reserved until the transaction is committed or canceled. For example, a contract that specifies that user A agrees to pay user B amount AMT in currency C if S&P 500 index (SP) at the end of the year is below a threshold T. The smart contract is composed of 1) a digital check with an asset ID 1310 of amount AMT in currency C issued with certified seal in wallet A, 2) a payment transaction that the digital check is paid to wallet B, 3) the condition is that SP<T at the end of the year and verified by S&P 500 index verifier V, 4) the signature 1346 of wallet A to confirm that A agrees to the contract, 5) the digital signature 1330 of the certified seal of currency C to confirm that check CID is valid and the check will be available at the end of the contract, and 6) the digital signature 1360 of the verifier V at the end of the year to verify that SP<T. Once the contract is signed and the condition above is met, user B may submit the transaction to the currency issuer and exchange it for a digital check. In this example embodiment, a contract can be executed once all the positive conditions are met. If one negative condition is confirmed the contract may be cancelled. One or more condition verifiers may be required in a contract to verify one or more conditions.

Example Use Case 5—Digital Contract or Document Signature

Figure 13:
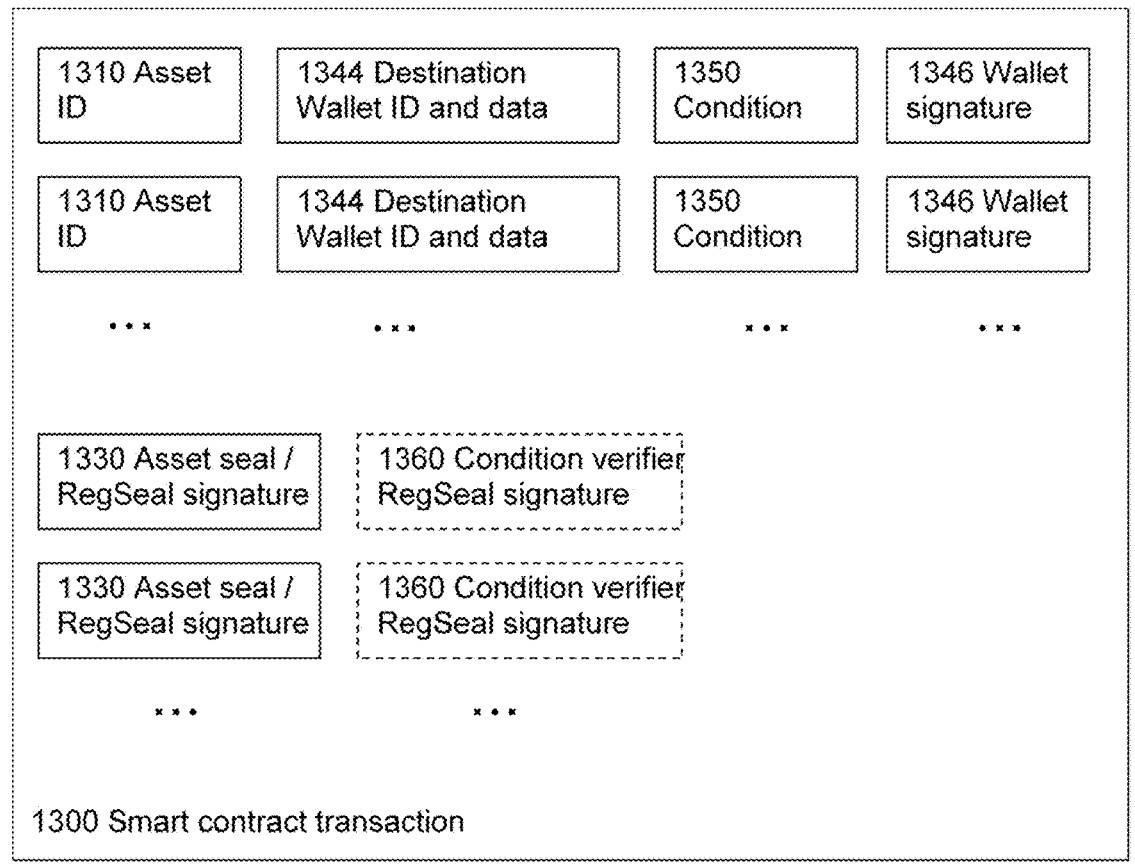
Figure 13:
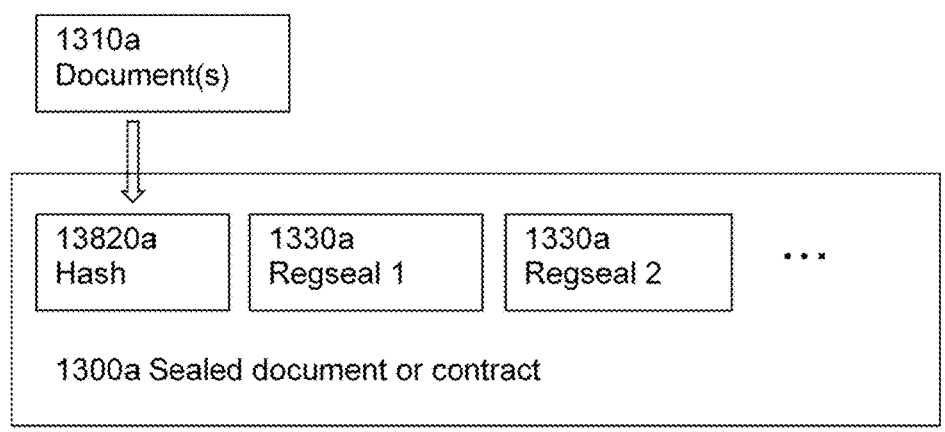

In another example embodiment, one or more certified entities can sign a digital contract or document with the scheme disclosed, as shown in FIG. 13. Each entity signs the hash 1320a of a document 1310a with its RegSeal to create digital signatures 1330a. The resulting record 1300a is a digitally signed document or contract.

For example, a contract between two individuals may include a sealed driver's license used to sign a contract. A driver's license can be sealed by a government agency. The Seal-ID can be used as driver's license number and its corresponding private key is owned by the issuer or DMV so as to ensure that the sealed driver's license is not and cannot be fake. Additionally, an extra private-public key pair can be sealed with the sealed asset record and the individual or driver owns the private key. The two individuals sign the contract by using their private keys as in FIG. 13 to create digital signatures 1330a. The sealed document 1300a proves the contract is truly signed by the two individuals or drivers.

Another example is to use a RegSeal to certify an email address and use its private-key to sign emails. It can prove that the email is really sent by the owner of the RegSeal. As a result, phishing emails or spam emails can be filtered out with a high level of certainty.

Example Use Case 6—Identity Verification

Once an entity is certified with a RegSeal the corresponding private-key and public key pair can be used for identity verification. For example, the private-key and public-key pair may be used for password-less login. For example, a website can send a random number to the entity, the entity encrypts the random number with its private-key and sends back the encrypted cipher to the website. The website decrypts the cipher with the public-key to get back the random number and it should match the original random number sent to the entity.

Example Use Case 7—Authentication Service

In the current environment, credit card fraud is commonly associated with unauthorized use of credit cards by unauthorized users. By using a digitized credit card (digital asset), merchants can make sure that the card is indeed issued by the right credit card companies (CertEntity) and it is the holder's private-key that created a digital signature to certify the user identity. Since the digital signature is different each time (e.g., only the private key is the same), hackers will not benefit from stealing the digital signature. The card holder's digital signature combined with their digital credit card ensures the correct, certified person is using the right card to conduct the transaction.

Another example is provided with respect to reward points and gift card points transactions. The certified entities may include the reward program issuer (e.g., airline, hotel, restaurant, etc.) and/or an ecommerce company. The sealed assets may include reward points, trading transactions, digital wallets. Similar to the digital cash example, reward points and points trading may be securely digitized. Based on the disclosure herein, a novel and secure method is provided allowing consumers to sell their personal rewards on different ecommerce platforms. For example, the consumer will get a digital reward (digital asset) certified by reward issuer (CertEntity). Moreover, ecommerce companies can easily validate the authenticity of the reward and once an order is placed, the transaction may be stamped by the reward owner and sent to the reward issuer to clear the transaction.

In yet another example, government certificates may include certified entities such as government agencies to which the government agencies may issue digital certificates according to the operational steps provided here. Sealed assets may include, for example, passport identification, government-issued certificates, licenses, and the like. An examiner of such sealed asset may verify with a high confidence level that the government-issued document was indeed issued by the corresponding authority.

With regards to conducting background checks, certified entities such as schools and/or employers may provide certify student graduates having sealed assets such as a graduation certificate, employee work history, transcripts, and the like. For example, when a student graduates, the student's school can issue digital certificate of their educational degree. Another example is provided when an employee leaves a company, the employer can issue a digital certificate verifying the employee's work history and in the instance the employee applies for a new job at a new employer, the employee may submit the digital degree and work history to the new employer with confidence because the new employer can easily check the issuing parties via various embodiments discussed herein. As such, time-consuming background checks can be avoided. Other example use cases may relate to credit checks where consumers can send digital copy of their credit score to loan companies directly because the loan company can verify the authenticity of the document using the invention discussed herein. Additionally, private keys can be used to verify communications such a telephone calls, emails, are indeed from the rightful owner thereby preventing case of identity theft.

Example Use Case 8—Managing Permissions Using Digital Signature/Certificate

Figure 11:
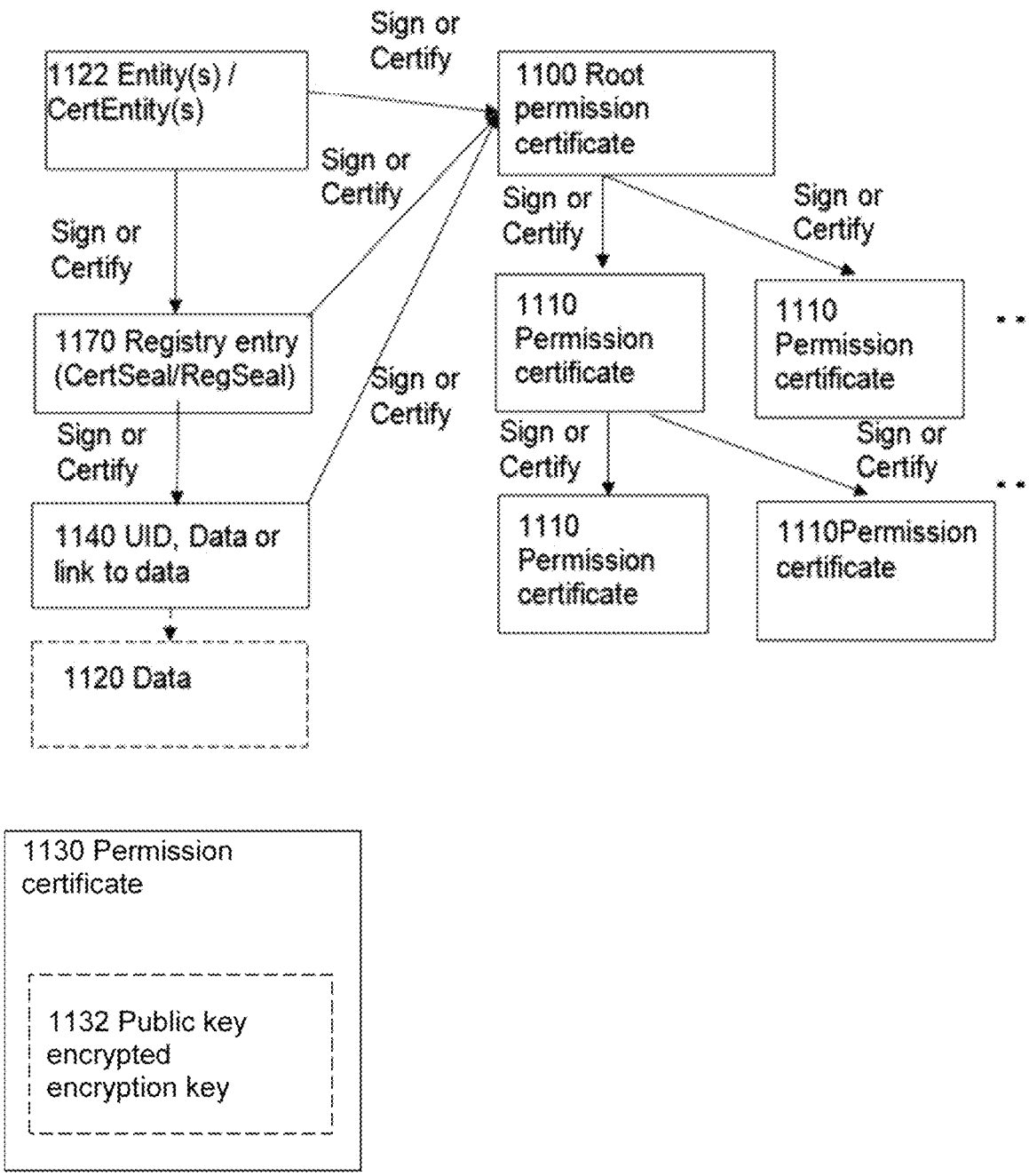

In an example embodiment, a public key encryption and/or digital signature/certificate is implemented to manage permission. Data to be protected is assigned/linked with a unique identifier (UID). The data can be the data itself, or can be a URL to the data. For example, data and its UID can be sealed by a certified seal (CertSeal) and the CertSeal is certified by a certified entity, as described above. To manage the permission of the data, a root permission certificate 1100 of FIG. 11, is created that comprises a public key, and optionally the type of permissions (e.g., read, write access) and a digital signature of the certified entity or the certified seal, or the data. In an example embodiment, the root permission certificate 1100 is digitally signed using the digital signature of the data 1140 by, for example, a public key as the UID 1132 and using the private key to sign a digital signature. The signing of the root permission certificate serves as proof that the permission is granted by the owner of the data. In another example embodiment, a digital signature may be obtained using data 1140 by using a public key as its UID and using the private key to sign a signature.

In this example, the data does not need to be certified by a certified seal if the root permission certificate is signed by the data 1140. To grant permission to a user, organization, device, or service, etc., a user generates another private key-public key pair, the public key is digitally signed with the root permission certificate, and optionally with permission type to create another permission certificate providing permission for the user. In some examples, a permission certificate can sign other permission certificates forming a tree structure as shown by 1110 permission certificates in FIG. 11.

To verify that a user has permission to data, the user provides evidence of the ownership of the private key of a permission certificate 1130, the permission certificate is verified by a chain of permission certificate(s) 1110 to a root permission certificate 1100, the root certificate 1100 is certified by the data itself or certified by a certified seal of the data or by certified entity of the data 1170. These certificates link a user permission certificate to data. In this example, the owner of the data controls the permission, not the hosted party.

In another example embodiment, one way to protect data is that its owner can host the data itself and only provide a URL link to the data. UID and/or permission certificates may be hosted by a third party. When a user access the data, its owner can first verify that the user has proper permission according to the embodiments herein.

In yet another example embodiment, data is encrypted. The encryption key of the data is passed to an end user by embedding the encryption key in the permission certificates. The encryption key can be encrypted using the public key of a permission certificate 1132. The owner of the permission certificate is the only one who can get the encryption key with the corresponding private key. The encryption key can be passed down the certificate tree in this way. The public key encrypted encryption keys can also be stored separately from the permission certificates, for example, saved in one database such as a registry with the permission certificate public key as a lookup key, according to example embodiments described herein.

In this example embodiment, the data and its permission can be bound together using digital signature(s) and permission can be granted to a user using a digital signature. The user may grant permission to other users and the permission can include permission to grant permission to others.

Example Use Case 9—Personal Identity Certification

Entities as described above such as, for example, a notary public and postal office, etc., can be certified by an entity certifier. The certified entities can then use their RegSeal to certify an individual and issue a RegSeal for the individual. This individual can then use their RegSeal to prove their identity, create digital signature, evidence of presence, and the like in cases such as, for example, signing contracts, applying for loans, authorizing use of credit card, insurance card, sale of assets, creating digital signature for evidence of doctor visits, etc.

Personal identity certification can be used for fighting credit card fraud. Unauthorized use of credit card is a very common problem today. When new credit cards are mailed to the card holder's address, mail may be subject to theft resulting in misused credit cards. As such, companies have no reliable ways to ensure the authenticity of the users. Furthermore, when the card holder is not present when a card is used (e.g. online purchase), it is hard to ensure the real owner is using the card in such credit card transactions.

Using embodiments of the invention, a credit card company may register a cardholder's public key notarized by a notary public. When a message is sent to the owner seeking confirmation, the message may be encrypted using the owner's public key as discussed above. The owner can take action accordingly after receiving the message. Since only the owner has its private key, only the owner can decrypt and respond. No other person will be able to confirm the message.

In another example, an entity may only want authorized verifiers to access server information. For example, an insurance company may only want its authorized doctor's office to be able to access patient insurance card information. A military agency may only want to issue limited information on a physical card so that when the card is lost, the confidential information is not exposed (e.g., photo of user, data of birth, SSN, etc.). However, an authorized user can obtain more information by checking a sealed asset using a verifier. To achieve this, the user of a verifier application may use the verifier application to certify a public key with an entity certifier to get a RegSeal as described above. The user can then register their identity with the verifier application using the RegSeal to prove their identity. Accordingly, permission is granted based on the certified identity. In this way, all future communication can be encrypted by using the certificate public key thereafter to ensure only the authorized verifier can validate certain information.

Once a public key of an individual is notarized as a certificate, the private key of the individual can be stored in a digital wallet on a phone or any hardware device or server that is accessible via password, fingerprint, voice recognition, facial recognition, or other safety methods. The wallet may store multiple payment methods, such as Apple pay, credit card, debit card, etc. and whenever a payment card is being used, for example on a ecommerce web site, before checkout, the ecommerce company will communicate the shopping cart information to the individual's device, including information such as items purchased, amount, etc. This information can be encrypted using the individual's public key so that only the owner of the payment card can decipher the message. Once the message is received, an individual can select a payment method, optionally enter a shipping address, and authorize the use of the payment method by encrypting the message using their private key. In this case both the ecommerce company and the selected payment card company know that the transaction is authorized and approved by true card holder since only their private key can decrypt the message. As such, payment can be authorized quickly and successfully based on the signed authorization. This novel method can eliminate a lot of potential unauthorized card purchases by making sure the real owner is using the card.

In an example embodiment, the public key encrypted messages sent to a real card holder can be triggered by events such as, for example, an insurance card is being scanned, an alert sent to the real owner registered. Ecommerce companies can also present all the shopping cart information in the form of a device readable code such as QR code for display at checkout to which the individual can scan the code using the scanner on his/her wallet device. The device can prompt the selection of a payment method from the wallet. The wallet can then encrypt the payment information and send to the ecommerce company for authorization by the credit card company to expedite checkout. The same method can be applied when a user is using their wallet for face-to-face payment at a brick and mortar. In this case, the user can scan the code presented by the seller and authorize payment.

Example User Interfaces

FIGS. 14, 14a, 14b, and 14c show example displays that may be presented by one or more display screens of one or more computing devices (e.g., user computing devices) for implementing an example configuration according to various embodiments. For example, the displays of FIGS. 14, 14a, 14b, and 14c can be presented to a user by desktop or laptop computer, or by a mobile, handheld merchant device. These displays may aid in facilitating the acquisition and transmittal of a sealed document from one user to another user.

The displays of FIGS. 14, 14a, 14b, and 14c can be used to provide a relatively simple, quick, and intuitive way for the entity to request a sealed asset and transmit the sealed asset using the system. The displays of FIGS. 14, 14a, 14b, and 14c can be used, for example, as a portal to create a seal asset, provide a sealed asset for selection and transmittal to a user or entity, and provide verification of the sealed asset to verify that the sealed asset is sealed by a certified entity and has not been tampered with or modified since the time the asset was sealed.

In one example, the display 1400 of FIG. 14 is shown as including a series of fields enabling the user to initiate the creation of a new sealed asset. In this example, the user Jane Smith is a past employer of John McClane who may be requesting a sealed proof of employment. For example, the display 1400 may be configured for receipt of user input selecting a new sealed proof of employment 1404. Upon selection to create a new sealed document or asset, in this case, proof of employment, the user Jane Smith may enter personal details of past employee John McClane 1402. As shown by 1401, the display may allow the user Jane Smith to add selected documents providing the proof of employment into the envelope. The display 1400 provides an action to seal and certify the envelope comprising the proof of employment documentation 1402. The display further provides for transmitting the sealed proof of employment to the employee, for example to a user computing entity associated with the employee. The employee may then transmit (via the user computing entity) the sealed proof of employment to other users (e.g., a prospective new employer) to access the sealed data.

In another example, the display 1400a of FIG. 14a is shown as providing the user Jane Smith the ability to search for a sealed asset via a search input graphical element 1401a. Once the user enters search criteria (e.g., employee's SSN), the search results 1402a are presented on display 1400a. For each search result, the display 1400a provides actions such as to forward the sealed asset, copy the sealed asset, manage viewing or access permissions, delete the sealed asset, and/or the like. The display 1400a further provides the action of creating a new sealed asset 1403a.

In one example, the display 1400b of FIG. 14b is shown in which employee John McClane may view a list of sealed assets he owns. As shown in 1401b, the list includes proof of employment, created at two different timestamps, and a diploma. The display 1400b of the illustrated example provides the user with an option to forward at least one selected sealed asset 1402b such as, the most recent proof of employment.

Figure 14C:
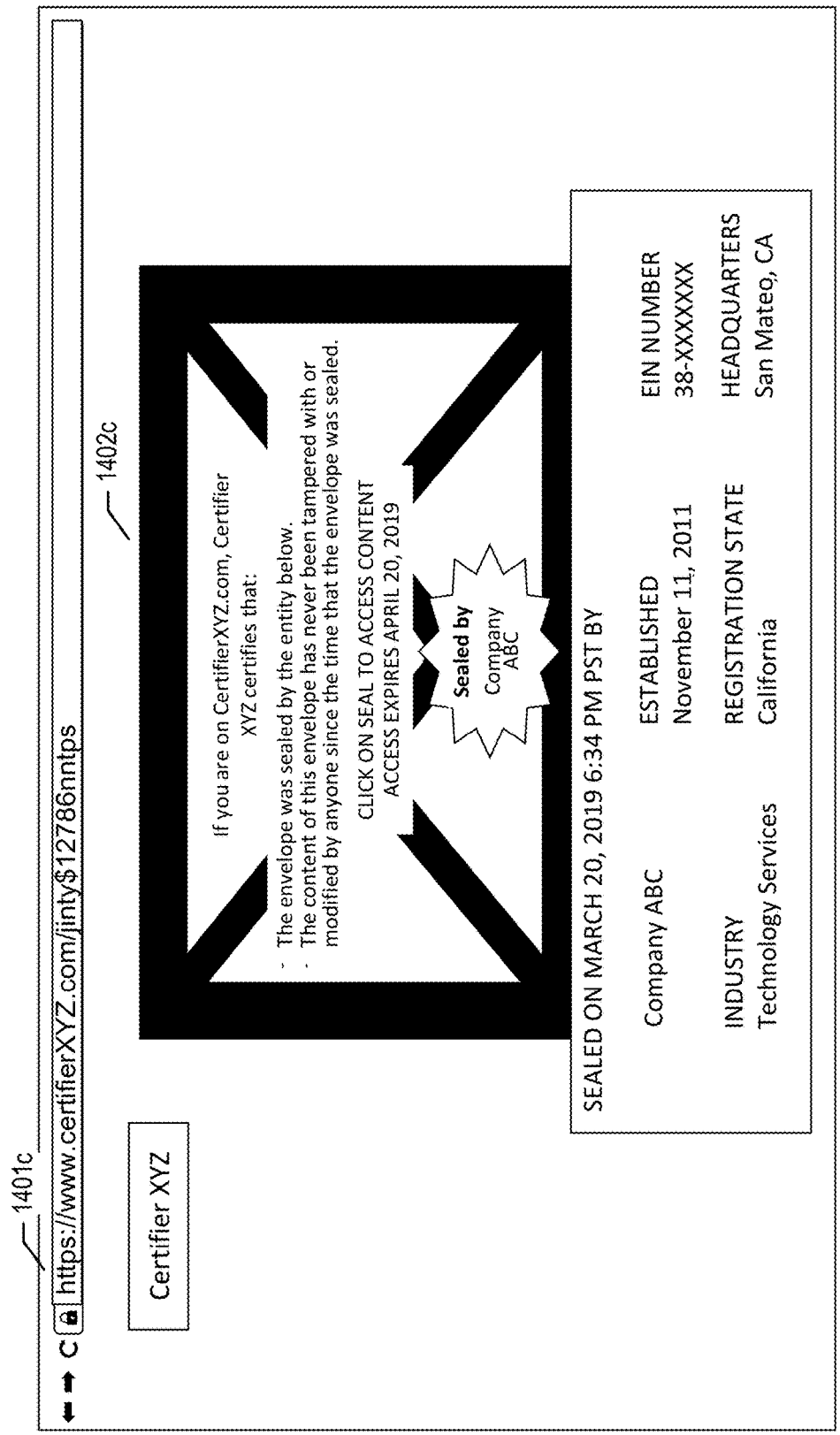

As shown by display 1400c of FIG. 14c, a recipient of the sealed asset transmittal may be provided with a link 1401c to access the sealed asset. The display 1400c is shown as including the envelope (e.g., sealed asset) with information 1402c comprising one or more of: the certifier, the entity, a date of when the seal was established, a unique seal ID, an access expiration date and/or the like. The display 1400c comprising the envelope provides confirmation that the envelope was sealed by the entity below (verified by certificate authority) and that contents of the envelope have not been tampered with or modified by anyone since the time that the envelope was sealed as verified by the certifier.

It is noted that all or some of the information presented by the example displays discussed herein may be based on data that is received, generated and/or maintained by one or more components of the system.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for generating a registered certified seal, the apparatus comprising at least one processor, and at least one memory having computer coded instructions therein, with the computer instructions configured to, when executed by the processor, cause the apparatus to:
   receive a request to generate a registered certified seal from an entity, wherein the request comprises a digitally signed entity certifying certificate comprising a public key of a public key-private key pair;
   access certifier entity data of a certification authority identified by the certifying certificate;
   verify the digitally signed entity certifying certificate based at least in part on the certifier entity data associated with the certifying certificate and accessed from the certification authority;
   upon verifying the digitally signed entity certifying certificate, receive seal data comprising a seal data key for a certified seal; and
   save the seal data for the entity within a digital seal registry, wherein the digital seal registry is searchable based at least in part on at least a portion of the seal data key, and wherein the seal data further comprises any sealer information indicating what the seal is used for, how the seal is used, and a time range the electronic seal is valid.

2. The apparatus of claim 1, wherein the digitally signed entity certifying certificate certifies the entity by the certification authority.

3. The apparatus of claim 1, wherein verifying the digitally signed entity certifying certificate based at least in part on the certifier entity data associated with the certifying certificate comprises:
   determining whether the entity is authentic based on at least one unique entity identifier; and
      after determining that the entity is authentic, digitally sign identity entity data comprising the at least one unique entity identifier to generate the entity certifying certificate.

4. The apparatus of claim 1, wherein the digital seal registry is a software as a service (SaaS) registry service.

5. The apparatus of claim 1, wherein the seal data key comprises at least one of a seal public key of the certified seal and seal data to uniquely identify the certified seal.

6. The apparatus of claim 1, wherein the computer coded instructions are further configured to, when executed by the processor, to cause the apparatus to:
   receive a request to verify a sealed asset, wherein the sealed asset is generated by the entity and identifies the seal data key;
   query the digital seal registry based at least in part on the seal data key; and
   verify the sealed asset based at least in part on the seal data key.

7. A computer-implemented method for generating a registered certified seal, the method comprises:
   receiving a request to generate a registered certified seal from an entity, wherein the request comprises a digitally signed entity certifying certificate comprising a public key of a public-key private-key pair;
   accessing certifier entity data of a certification authority identified by the certifying certificate;
   verifying the digitally signed entity certifying certificate based at least in part on the certifier entity data associated with the certifying certificate and accessed from the certification authority;
   upon verifying the digitally signed entity certifying certificate, receiving seal data comprising a seal data key for a certified seal; and
   saving the seal data for the entity within a digital seal registry, wherein the digital seal registry is searchable based at least in part on at least a portion of the seal data key, and wherein the seal data further comprises any sealer information indicating what the seal is used for, how the seal is used, and a time range the electronic seal is valid.

8. The computer-implemented method of claim 7, wherein the digitally signed entity certifying certificate certifies the entity by the certification authority.

9. The computer-implemented method of claim 7, wherein verifying the digitally signed entity certifying certificate based at least in part on the certifier entity data associated with the certifying certificate comprises:
   determining whether the entity is authentic based on at least one unique entity identifier; and
      after determining that the entity is authentic, digitally sign entity data comprising the at least one unique entity identifier to generate the entity certifying certificate.

10. The computer-implemented method of claim 7, wherein the digital seal registry is a software as a service (SaaS) registry service.

11. The computer-implemented method of claim 7, wherein the seal data key comprises at least one of a seal public key of the certified seal and seal data to uniquely identify the certified seal.

12. The computer-implemented method of claim 7, further comprising:
   receiving a request to verify a sealed asset, wherein the sealed asset is generated by the entity and identifies the seal data key;
   querying the digital seal registry based at least in part on the seal data key; and
   verifying the sealed asset based at least in part on the seal data key.

13. A computer program product for generating a registered certified seal, the computer program product comprising a non-transitory computer readable storage medium and computer program instructions stored therein, the computer program instructions comprising program instructions configured to:
   receive a request to generate a registered certified seal from an entity, wherein the request comprises a digitally signed entity certifying certificate comprising a public key of a public key-private key pair;
   accessing certifier entity data of a certification authority identified by the certifying certificate;
   verify the digitally signed entity certifying certificate based at least in part on the certifier entity data associated with the certifying certificate and accessed from the certification authority;
   upon verifying the digitally signed entity certifying certificate, receive seal data comprising a seal data key for a certified seal; and
   save the seal data for the entity within a digital seal registry, wherein the digital seal registry is searchable based at least in part on at least a portion of the seal data key, and wherein the seal data further comprises any sealer information indicating what the seal is used for, how the seal is used, and a time range the electronic seal is valid.

14. The computer program product of claim 13, wherein the digitally signed entity certifying certificate certifies the entity by the certification authority.

15. The computer program product of claim 13, wherein verifying the digitally signed entity certifying certificate based at least in part on the certifier entity data associated with the certifying certificate comprises:
- determining whether the entity is authentic based on at least one unique entity identifier; and
- after determining that the entity is authentic, digitally sign identity entity data comprising the at least one unique entity identifier to generate the entity certifying certificate.

16. The computer program product of claim 13, wherein the digital seal registry is a software as a service (SaaS) registry service.

17. The computer program product of claim 13, wherein the seal data key comprises at least one of a seal public key of the certified seal and seal data to uniquely identify the certified seal.

* * * * *